US012632267B2

(12) United States Patent
Zhao et al.

(10) Patent No.: US 12,632,267 B2
(45) Date of Patent: May 19, 2026

(54) DEVICE CONFIGURATION METHOD, ELECTRONIC APPARATUS AND COMPUTER-READABLE STORAGE MEDIUM

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Junjie Zhao, Beijing (CN); Jing Su, Beijing (CN); Hongbo Feng, Beijing (CN); Shaobei Chen, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 129 days.

(21) Appl. No.: 18/684,709

(22) PCT Filed: Jul. 11, 2022

(86) PCT No.: PCT/CN2022/104827
§ 371 (c)(1),
(2) Date: Feb. 19, 2024

(87) PCT Pub. No.: WO2023/024729
PCT Pub. Date: Mar. 2, 2023

(65) Prior Publication Data
US 2026/0119193 A1        Apr. 30, 2026

(30) Foreign Application Priority Data

Aug. 25, 2021    (CN) .......................... 202110980839.6

(51) Int. Cl.
G06F 9/4401        (2018.01)
G06F 21/83        (2013.01)
H04N 23/611        (2023.01)

(52) U.S. Cl.
CPC ............ G06F 9/4411 (2013.01); G06F 21/83 (2013.01); H04N 23/611 (2023.01)

(58) Field of Classification Search
None
See application file for complete search history.

(56) References Cited

U.S. PATENT DOCUMENTS

2018/0261307 A1     9/2018  Couse et al.
2018/0374233 A1*   12/2018  Zhou ....................... G06F 18/22
(Continued)

FOREIGN PATENT DOCUMENTS

CA        2957567 A1     8/2018
CN      108055455 A     5/2018
(Continued)

OTHER PUBLICATIONS

International Search Report (ISR) and Written Opinion of PCT/CN2022/104827, dated Oct. 10, 2022, Chinese & English.

*Primary Examiner* — June Sison
(74) *Attorney, Agent, or Firm* — Chiwin Law LLC

(57)        ABSTRACT

A device configuration method, an electronic apparatus, and a computer-readable storage medium are disclosed. The method is applied to a server side, and includes: acquiring identification information of a first device, and sending a content acquisition request to the first device; acquiring a content acquisition response sent by the first device, and the content acquisition response includes a first content acquired by the first device; determining whether the first content satisfies a privacy protection rule; and in response to the first (Continued)

S10  acquiring identification information of the first device, and sending a content acquisition request to the first device S11  acquiring a content acquisition response sent by the first device S12  judging whether the first content meets a privacy protection rule

NO

S13  performing device configuration on the first device content dissatisfying the privacy protection rule, performing device configuration on the first device.

18 Claims, 11 Drawing Sheets

(56) References Cited

U.S. PATENT DOCUMENTS

| | | | |
|---|---|---|---|
| 2019/0166330 A1* | 5/2019 | Ma | H04L 65/403 |
| 2021/0243360 A1* | 8/2021 | Onoe | H04N 23/667 |
| 2022/0247929 A1* | 8/2022 | Yang | H04N 23/667 |
| 2023/0027977 A1* | 1/2023 | Ahn | H04L 51/52 |
| 2024/0143836 A1* | 5/2024 | Lazzara | G06F 21/6254 |

FOREIGN PATENT DOCUMENTS

| | | | |
|---|---|---|---|
| CN | 109729431 A | 5/2019 |
| CN | 109918944 A | 6/2019 |
| CN | 110719402 A | 1/2020 |
| CN | 110996010 A | 4/2020 |
| CN | 111917981 A | 11/2020 |

\* cited by examiner

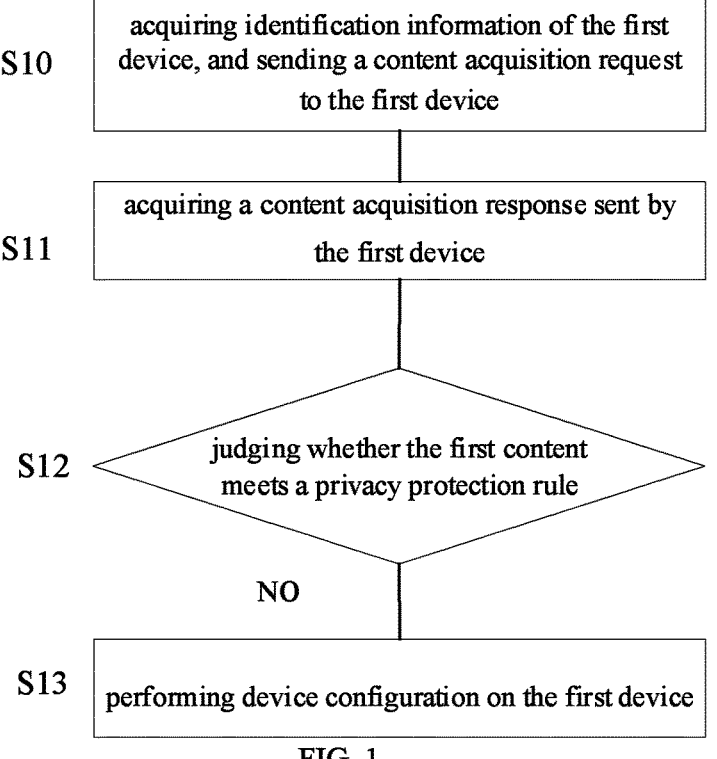

S10    acquiring identification information of the first device, and sending a content acquisition request to the first device S11    acquiring a content acquisition response sent by the first device S12    judging whether the first content meets a privacy protection rule

NO

S13    performing device configuration on the first device

FIG. 1

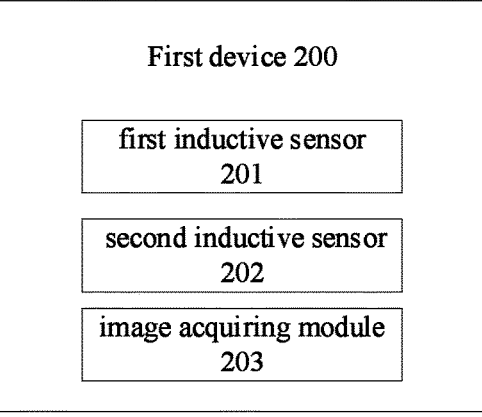

First device 200 first inductive sensor 201 second inductive sensor 202 image acquiring module 203

FIG. 2A

First device 200 first inductive sensor 201 image acquiring module 203

FIG. 2B first inductive sensor 201

DEVICE CONFIGURATION METHOD, ELECTRONIC APPARATUS AND COMPUTER-READABLE STORAGE MEDIUM

CROSS-REFERENCE TO RELATED APPLICATION

This application is a U.S. National Phase Entry of International Application No. PCT/CN2022/104827 filed on Jul. 11, 2022, designating the United States of America and claiming priority to Chinese Patent Application No. 202110980839.6, filed on Aug. 25, 2021. The present application claims priority to and the benefit of the above-identified applications and the above-identified applications are incorporated by reference herein in their entirety.

TECHNICAL FIELD

Embodiments of the present disclosure relate to a device configuration method, an electronic device and a computer-readable storage medium.

BACKGROUND

With development of the Internet of Things technology, smart home devices such as smart door locks, smart visual doorbells, and smart cat eyes, etc., have become product hotspots and are gradually accepted by users. These smart home devices may enhance home safety and convenience. A main portion of the smart home device is installed outdoors and may be coupled to the Internet of Things platform through local wireless network, and may perform human body detection through an instrument such as a proximity sensor (e.g., Passive Infrared Ray (PIR)). Meanwhile, the smart home device has a video communication function, and is capable of performing video calls with other devices and terminals of the family. In addition, the smart home device has a safety monitoring function; when "a person passes by", a camera is activated to snap and send captured videos and photos to a user for viewing.

SUMMARY

At least one embodiment of the present disclosure provides a device configuration method, applied to a server side, and comprising: acquiring identification information of a first device, and sending a content acquisition request to the first device; acquiring a content acquisition response sent by the first device, wherein the content acquisition response comprises a first content acquired by the first device; judging whether the first content meets a privacy protection rule, and performing device configuration on the first device in response to the first content not meeting the privacy protection rule.

For example, in the device configuration method provided by at least one embodiment of the present disclosure, before performing device configuration on the first device, the device configuration method further comprises: sending a configuration adjustment confirmation request to a first terminal associated with the first device; and performing device configuration on the first device in response to receiving the configuration adjustment confirmation response sent from the first terminal.

For example, in the device configuration method provided by at least one embodiment of the present disclosure, the performing device configuration on the first device, comprises: configuring at least one first function of the first device to make the first content acquired by the first device configured meet the privacy protection rule; wherein the configuring at least one first function of the first device comprises: configuring a function parameter of the at least one first function.

For example, in the device configuration method provided by at least one embodiment of the present disclosure, the at least one first function comprises a first image shoot function; and the configuring at least one first function of the first device, comprises: configuring the first image shoot function.

For example, in the device configuration method provided by at least one embodiment of the present disclosure, the at least one first function comprises a first image shoot function and a first object sensing function, the first image shoot function is activated or deactivated according to the first object sensing function; the configuring at least one first function of the first device, comprises: configuring the first image shoot function and/or the first object sensing function.

For example, in the device configuration method provided by at least one embodiment of the present disclosure, the first device comprises an image acquiring module, the image acquiring module is configured to implement the first image shoot function; and the first content comprises static image information and/or dynamic image information acquired by the image acquiring module; the privacy protection rule comprises that: the static image information and/or the dynamic image information does not comprise a privacy concern object, and/or clarity of a portion of the static image information and/or the dynamic image information that comprises the privacy concern object is less than a clarity threshold; a function parameter of the first image shoot function comprises a shooting distance corresponding to the image acquiring module, the configuring the first image shoot function, comprises: adjusting time for the image acquiring module of the first device to capture the object, so as to limit the first image shoot function in terms of usage time; and/or adjusting the shooting distance corresponding to the image acquiring module, to make a clarity of an image within a predetermined range comprising the privacy concern object less than the clarity threshold or make a content shot by the image acquiring module exclude the privacy concern object.

For example, in the device configuration method provided by at least one embodiment of the present disclosure, the first device comprises a first inductive sensor for implementing the first object sensing function, a function parameter of the first object sensing function comprises a sensing distance corresponding to the first inductive sensor, and the configuring the first object sensing function comprises: adjusting the sensing distance corresponding to the first inductive sensor; or the first device comprises a first inductive sensor and a second inductive sensor for implementing the first object sensing function, function parameters of the first object sensing function comprise a sensing distance corresponding to the first inductive sensor and a sensing distance corresponding to the second inductive sensor, and the configuring the first object sensing function comprises: configuring the sensing distance corresponding to the first inductive sensor and/or the sensing distance corresponding to the second inductive sensor.

For example, in the device configuration method provided by at least one embodiment of the present disclosure, the at least one first function comprises a first image shoot function, a first object sensing function, and a first snapping function, and the first snapping function is implemented based on the first object sensing function triggering the first image shoot function, the configuring at least one first function of the first device, comprises: configuring the first snapping function and/or the first object sensing function.

For example, in the device configuration method provided by at least one embodiment of the present disclosure, the first device comprises a first inductive sensor for implementing the first object sensing function, the first snapping function comprises a first pedestrian pass-by snapping function, and the first pedestrian pass-by snapping function is implemented based on sensing data of the first inductive sensor triggering the first image shoot function; the first content comprises static image information and/or dynamic image information acquired by the image acquiring module; the privacy protection rule comprises that: the static image information and/or the dynamic image information does not comprise a privacy concern object, and/or clarity of a portion of the static image information and/or the dynamic image information that comprises the privacy concern object is less than a clarity threshold; the configuring the first snapping function and/or the first object sensing function, comprises: determining a first current sensing distance and a first sensing distance threshold corresponding to the first inductive sensor, wherein the first sensing distance threshold is a distance corresponding to a minimum sensing range of the first inductive sensor when sensing an object; determining an object distance between the first device and the privacy concern object; deactivating the first pedestrian pass-by snapping function, in response to a product of the object distance and a preset parameter being less than or equal to the first sensing distance threshold; in response to the product of the object distance and the preset parameter being greater than the first sensing distance threshold and less than or equal to the first current sensing distance, adjusting the first current sensing distance so that the first current sensing distance adjusted is less than the object distance.

For example, in the device configuration method provided by at least one embodiment of the present disclosure, the first device comprises a first inductive sensor and a second inductive sensor for implementing the first object sensing function, the first snapping function comprises a first pedestrian pass-by snapping function and a first hover snapping function, the first pedestrian pass-by snapping function is implemented based on sensing data of the first inductive sensor triggering the first image shoot function, the first hover snapping function is implemented based on sensing data of the second inductive sensor triggering the first image shoot function; the first content comprises static image information and/or dynamic image information acquired by the image acquiring module; the privacy protection rule comprises that: the static image information and/or the dynamic image information does not comprise a privacy concern object, and/or clarity of a portion of the static image information and/or the dynamic image information that comprises the privacy concern object is less than a clarity threshold; the configuring the first snapping function and/or the first object sensing function, comprises: determining a first current sensing distance and a first sensing distance threshold corresponding to the first inductive sensor, and determining a second current sensing distance corresponding to the second inductive sensor, wherein the first sensing distance threshold is a distance corresponding to a minimum sensing range of the first inductive sensor when sensing an object, the second current sensing distance is less than the first current sensing distance; determining an object distance between the first device and the privacy concern object; in response to a product of the object distance and a preset parameter being greater than the first sensing distance threshold, adjusting the first current sensing distance to make the first current sensing distance adjusted less than the product of the object distance and the preset parameter; deactivating the first pedestrian pass-by snapping function in response to the product of the object distance and the preset parameter being less than or equal to the first sensing distance threshold and greater than the second current sensing distance; in response to the product of the object distance and the preset parameter being less than or equal to the first sensing distance threshold and less than or equal to the second current sensing distance: determining a second sensing distance threshold corresponding to the second inductive sensor, wherein the second sensing distance threshold is a distance corresponding to a minimum sensing range of the second inductive sensor when sensing an object; in response to the product of the object distance and the preset parameter being greater than the second sensing distance threshold, and adjusting the second current sensing distance so that the second current sensing distance adjusted is less than the product of the object distance and the preset parameter, and deactivating the first pedestrian pass-by snapping function; and deactivating the first pedestrian pass-by snapping function and the first hover snapping function, in response to the product of the object distance and the preset parameter being less than or equal to the second sensing distance threshold.

For example, in the device configuration method provided by at least one embodiment of the present disclosure, the preset parameter is a constant within a range of $\frac{1}{3}$ to 1.

For example, in the device configuration method provided by at least one embodiment of the present disclosure, the server side has a second device corresponding thereto; the device configuration method further comprises: performing device configuration on the second device, in response to the first content not meeting the privacy protection rule.

For example, in the device configuration method provided by at least one embodiment of the present disclosure, the first device comprises a first inductive sensor for implementing the first object sensing function, the first snapping function comprises a first pedestrian pass-by snapping function, and the first pedestrian pass-by snapping function is implemented based on sensing data of the first inductive sensor triggering the first image shoot function; the second device has at least one second function, the at least one second function comprises a second image shoot function and a second object sensing function, the second image shoot function is activated or deactivated according to the second object sensing function, and the second device comprises a third inductive sensor for implementing the second object sensing function; the first content comprises static image information and/or dynamic image information acquired by the image acquiring module; the privacy protection rule comprises that: the static image information and/or the dynamic image information does not comprise a privacy concern object, and/or clarity of a portion of the static image information and/or the dynamic image information that comprises the privacy concern object is less than a clarity threshold; the configuring the first snapping function and/or the first object sensing function, comprises: determining a first current sensing distance and a first sensing distance threshold corresponding to the first inductive sensor, and a third current sensing distance and a third sensing distance threshold corresponding to the third inductive sensor, wherein the first sensing distance threshold is a distance corresponding to a minimum sensing range of the first inductive sensor when sensing an object, and the third sensing distance threshold is a distance corresponding to a minimum sensing range of the third inductive sensor when sensing an object; determining a device distance between the first device and the second device; adjusting the first current sensing distance, in response to a sum of the first sensing distance threshold and the third sensing distance threshold being less than or equal to the device distance, so that no overlapping sensing region exists between the first inductive sensor and the third inductive sensor; and deactivating the first pedestrian pass-by snapping function, in response to the sum of the first sensing distance threshold and the third sensing distance threshold being greater than the device distance.

For example, in the device configuration method provided by at least one embodiment of the present disclosure, the at least one second function further comprises a second pedestrian pass-by snapping function, the performing device configuration on the second device, comprises: adjusting the third current sensing distance, in response to the sum of the first sensing distance threshold and the third sensing distance threshold being less than or equal to the device distance, so that no overlapping sensing region exists between the first inductive sensor and the third inductive sensor; deactivating the second pedestrian pass-by snapping function, in response to the sum of the first sensing distance threshold and the third sensing distance threshold being greater than the device distance.

For example, in the device configuration method provided by at least one embodiment of the present disclosure, the configuring at least one first function of the first device, comprises: in respond to receiving a function configuration request sent from a second terminal; configuring at least one first function of the first device, based on the function configuration request; and sending a function configuration response to the second terminal, after configuring the at least one first function of the first device.

For example, in the device configuration method provided by at least one embodiment of the present disclosure, a second device different from the first device is also registered to the server side, before acquiring the identification information of the first device, and sending the content acquisition request to the first device, the device configuration method further comprises: generating trigger information, wherein the generating trigger information, comprises: receiving first address information corresponding to the first device and second address information corresponding to the second device; and generating the trigger information, in response to the first address information and second address information being identical.

For example, in the device configuration method provided by at least one embodiment of the present disclosure, before acquiring the identification information of the first device, and sending the content acquisition request to the first device, the device configuration method further comprises: controlling the first device to send a test request, wherein the test request comprises a test signal and signal sending time; controlling the second device to receive the test request sent by the first device; and controlling the first device to receive a test response sent by the second device, wherein the test response comprises signal receiving time; wherein the acquiring a content acquisition response sent by the first device, comprises: acquiring the test request sent by the first device and the test response sent by the second device; and determining the first content in the content acquisition response, based on the test request and the test response.

For example, in the device configuration method provided by at least one embodiment of the present disclosure, the first device has a first object sensing function, the second device has a second object sensing function, the first device comprises a first inductive sensor for implementing the first object sensing function, and the second device comprises a third inductive sensor for implementing the second object sensing function, the privacy protection rule comprises a first current sensing distance corresponding to the first inductive sensor and a third current sensing distance corresponding to the third inductive sensor, and indicates that no overlapping sensing region exists between the first inductive sensor and the third inductive sensor, the judging whether the first content meets a privacy protection rule, comprises: determining a device distance between the first device and the second device, based on the test request and the test response in the first content; determining whether an overlapping sensing region exists between the first inductive sensor and the third inductive sensor, based on the first current sensing distance, the third current sensing distance, and the device distance; and determining that the first content does not meet the privacy protection rule, in response to an overlapping sensing region existing between the first inductive sensor and the third inductive sensor.

For example, in the device configuration method provided by at least one embodiment of the present disclosure, before acquiring the identification information of the first device, and sending the content acquisition request to the first device, the device configuration method further comprises: generating trigger information, wherein the generating trigger information, comprises: acquiring image information, wherein the image information comprises a video and/or a picture; analyzing the image information, to determine whether the image information comprises a privacy concern object; and generating the trigger information, in response to the image information comprising the privacy concern object; or the generating trigger information, comprises: receiving audio information and acquisition perspective information; and generating the trigger information, in response to the audio information comprising sound emitted by the privacy concern object, and the acquisition perspective information indicating that an acquisition perspective of the image acquiring module on the first device has not changed; or the generating trigger information, comprises: receiving device location information; acquiring a scene structure of a location of the first device based on the device location information; and generating the trigger information, in response to the scene structure indicating that a space corresponding to the first device comprises the privacy concern object; or the generating trigger information, comprises: receiving input information; and generating the trigger information, in response to the input information indicating that the space corresponding to the first device comprises the privacy concern object.

For example, in the device configuration method provided by at least one embodiment of the present disclosure, before acquiring the identification information of the first device, and sending the content acquisition request to the first device, the device configuration method further comprises: receiving trigger information sent from the second terminal, wherein the trigger information comprises the identification information of the first device, and the identification information is acquired by the second terminal.

For example, in the device configuration method provided by at least one embodiment of the present disclosure, the first device has a first object sensing function, and the first device comprises a first inductive sensor for implementing the first object sensing function, the privacy protection rule comprises that the privacy concern object is located outside the sensing range of the first inductive sensor, the first content comprises the first current sensing distance corresponding to the first inductive sensor and an object distance between the first device and the privacy concern object; the judging whether the first content meets the privacy protection rule, comprises: determining the first current sensing distance corresponding to the first inductive sensor and the object distance between the first device and the privacy concern object, based on the first content; and determining that the first content does not meet the privacy protection rule, in response to the object distance being less than or equal to the first current sensing distance.

For example, in the device configuration method provided by at least one embodiment of the present disclosure, before receiving the trigger information sent from the second terminal, the device configuration method further comprises: receiving a query request sent from the second terminal; and querying based on the query request and feeding back a query response to the second terminal, wherein the query response comprises a function list, all functions in the function list are activated functions, and the trigger information further comprises a function identification code of at least one function in the function list; or the query response comprises the first content meeting the privacy protection rule or the first content not meeting the privacy protection rule.

For example, in the device configuration method provided by at least one embodiment of the present disclosure, the function list comprises at least one of functions below: a video call function, an image snapping function, a first pedestrian pass-by snapping function, and a first hover snapping function, the acquiring a content acquisition response sent by the first device, comprises: in a case where a function indicated by the function identification code comprised in the trigger information is the video call function and/or the image snapping function, controlling the first device performing the video call function and/or the image snapping function, to acquire a test video and/or a test picture, wherein the test video and/or the test picture is a video and/or a picture acquired by the first device when performing the video call function and/or the image snapping function; determining the content acquisition response based on the test video and/or the test picture, wherein the first content in the content acquisition response comprises the test video and/or the test picture; in a case where the function indicated by the function identification code comprised in the trigger information is the first pedestrian pass-by snapping function and/or the first hover snapping function, sending indication information to the second terminal to indicate a target user to pass through the first device following a preset path and controlling the first device perform the first pedestrian pass-by snapping function and/or the first hover snapping function to acquire a test snap content; and determining the content acquisition response, based on the test snap content, wherein the first content in the content acquisition response comprises the test snap content.

For example, in the device configuration method provided by at least one embodiment of the present disclosure, judging whether the first content meets the privacy protection rule in the case where the first content comprises the test video and/or the test picture, comprises: determining that the first content does not meet the privacy protection rule, in response to determining that the test video and/or the test picture comprises a privacy concern object; judging whether the first content meets the privacy protection rule in the case where the first content comprises the test snap content, comprises: determining that the first content does not meet the privacy protection rule, in response to determining that the test snap content comprises the target user; or determining that the first content does not meet the privacy protection rule, in response to determining that the test snap content comprises the target user and a clarity of a region comprising the target user in the test snap content is greater than or equal to a clarity threshold.

For example, in the device configuration method provided by at least one embodiment of the present disclosure, the privacy concern object comprises at least one selected from the group consisting of a door, an elevator, stairs, a corridor, and a person.

At least one embodiment of the present disclosure further provides a device configuration method, applied to a first device, the device configuration method comprises: acquiring a content acquisition request; generating a content acquisition response, wherein the content acquisition response comprises a first content acquired by the first device; judging whether the first content meets a privacy protection rule, and performing device configuration on the first device in response to the first content not meeting the privacy protection rule.

For example, in the device configuration method provided by at least one embodiment of the present disclosure, the performing device configuration on the first device, comprises: configuring at least one first function of the first device, so that the first content acquired by the first device configured meets the privacy protection rule; wherein the configuring at least one first function of the first device comprises: configuring a function parameter of the at least one first function.

For example, in the device configuration method provided by at least one embodiment of the present disclosure, the content acquisition request is generated by the first device; or, the content acquisition request is sent by a server side to the first device, and the first device is registered to the server side.

For example, in the device configuration method provided by at least one embodiment of the present disclosure, before performing device configuration on the first device, the device configuration method further comprises: sending a configuration adjustment confirmation request to a first terminal associated with the first device; and performing device configuration on the first device, in response to receiving a configuration adjustment confirmation response sent from the first terminal.

At least one embodiment of the present disclosure further provides an electronic apparatus, the electronic apparatus comprises: a memory, configured to non-temporarily store computer-readable instructions; and a processor, configured to run the computer-readable instructions; wherein when run by the processor, the computer-readable instructions execute the device configuration method according to any embodiment of the present disclosure.

At least one embodiment of the present disclosure further provides a computer-readable storage medium, non-temporarily storing computer-readable instructions, wherein when run by a computer, the computer-readable instructions cause the computer to execute the device configuration method according to any embodiment of the present disclosure.

BRIEF DESCRIPTION OF DRAWINGS

In order to more clearly explain the technical scheme of the embodiments of the present disclosure, the drawings of the embodiments will be briefly introduced below. Obviously, the drawings in the following description only relate to some embodiments of the present disclosure, and are not limited to the present disclosure.

FIG. 1 is a schematic flow chart of a device configuration method provided by at least one embodiment of the present disclosure;

FIG. 2A is a schematic block diagram of a first device provided by at least one embodiment of the present disclosure;

FIG. 2B is a schematic block diagram of another first device provided by at least one embodiment of the present disclosure;

DETAILED DESCRIPTION

Figure 2C:
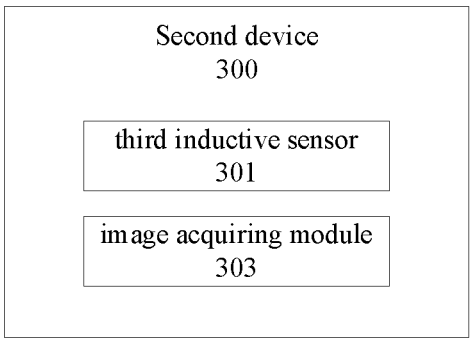
FIG. 2C is a schematic block diagram of a second device provided by at least one embodiment of the present disclosure.

In order to make the purpose, technical scheme and advantages of the embodiment of the disclosure more clear, the technical scheme of the embodiment of the disclosure will be described clearly and completely with the attached drawings. Obviously, the described embodiment is a part of the embodiment of the present disclosure, not the whole embodiment. Based on the described embodiments of the present disclosure, all other embodiments obtained by ordinary people in the field without creative labor belong to the scope of protection of the present disclosure.

Unless otherwise defined, technical terms or scientific terms used in this disclosure shall have their ordinary meanings as understood by people with ordinary skills in the field to which this disclosure belongs. The terms "first", "second" and the like used in this disclosure do not indicate any order, quantity or importance, but are only used to distinguish different components. Similar words such as "including" or "containing" mean that the elements or objects appearing before the word cover the elements or objects listed after the word and their equivalents, without excluding other elements or objects. Similar words such as "connected" or "coupled" are not limited to physical or mechanical connection, but can include electrical connection, whether direct or indirect. "up", "down", "left" and "right" are only used to indicate the relative positional relationship. When the absolute position of the described object changes, the relative positional relationship may also change accordingly.

In order to keep the following description of the embodiments of the present disclosure clear and concise, the detailed description of some known functions and known components is omitted in the present disclosure.

Because of development of urbanization, the majority of residents live in buildings, and each floor of a building usually includes a plurality of households (e.g., a plurality of households on one elevator, a plurality of households on two elevators, etc.); after a user installs a smart home device such as a smart door lock, a smart visual doorbell, and a smart cat eye, through a camera on the smart home device, the user may not only see information outside his/her own home, but may also see information about doorstep of a neighbor on a same floor as the user. When entry and exit information of the neighbor is recorded, once information leakage occurs, a security risk may be caused.

Neighbor privacy is a new privacy issue; and with increasing attention paid to privacy issues, principles that need to be followed for neighbor privacy issues mainly include that: (1) recording neighbor's daily travel information is not allowed; and (2) saving neighbor's daily travel information is not allowed.

At least one embodiment of the present disclosure provides a device configuration method; the device configuration method is applied to a server and includes: acquiring identification information of a first device, and sending a content acquisition request to the first device; acquiring a content acquisition response sent by the first device, and the content acquisition response includes a first content acquired by the first device; judging whether the first content meets a privacy protection rule; and performing device configuration on the first device in response to the first content not meeting the privacy protection rule.

At least one embodiment of the present disclosure further provides a device configuration method; the device configuration method is applied to a first device and includes: acquiring a content acquisition request; generating a content acquisition response, and the content acquisition response includes a first content acquired by the first device; judging whether the first content meets a privacy protection rule; and performing device configuration on the first device in response to the first content not meeting the privacy protection rule.

By using the device configuration method provided by the embodiments of the present disclosure, device configuration (e.g., function configuration and/or parameter configuration) may be performed on the first device, so that the first device meets the privacy protection rule, to avoid privacy infringement, avoid information leakage, improve information security, and reduce security risks.

At least one embodiment of the present disclosure further provides an electronic apparatus and a computer-readable storage medium corresponding to the above-described device configuration method.

Hereinafter, the embodiments of the present disclosure will be illustrated in detail in conjunction with the accompanying drawings, but the present disclosure is not limited to these specific embodiments.

FIG. 1 is a schematic flow chart of a device configuration method provided by at least one embodiment of the present disclosure; FIG. 2A is a schematic block diagram of a first device provided by at least one embodiment of the present disclosure; and FIG. 2B is a schematic block diagram of another first device provided by at least one embodiment of the present disclosure.

At least one embodiment of the present disclosure provides a device configuration method; the device configuration method is applied to a server, and may be executed by a processor or a computer. For example, the server may be a local server, a remote server, a network server (e.g., a cloud side), etc. The device configuration method may be applied to the field of the Internet of Things.

For example, as shown in FIG. 1, the device configuration method includes steps S10 to S13 below.

As shown in FIG. 1, step S10 includes: acquiring identification information of the first device, and sending a content acquisition request to the first device.

For example, the server side may acquire the identification information of the first device based on an instruction sent by a user, and the server may also acquire the identification information of the first device based on a trigger condition, the trigger condition may be an access request from other device, or may also be a time trigger condition, an event trigger condition, etc.

For example, after the first device is registered to the server side, the first device may be connected with the server by sending a request and receiving a response; and the server side manages the first device accessed to the server side. After the first device is registered to the server side, the first device may perform operations such as data transmission and information interaction with the server. For example, the server may include a Common Service Entity (CSE), while the first device may include an Application Entity (AE).

For example, the first device may be a smart home device such as a smart door lock, a smart visual doorbell, and a smart cat eye. For example, in a smart home scenario, various smart home devices (e.g., the above-described first device) may be directly accessed to the server side by wireless or wired means, or may also be firstly accessed to a local area network, and then accessed to the server side through a device such as a gateway in the local area network; the local area network may be a Personal Area Network (PAN), for example, a Wireless Personal Area Network (WPAN), which may implement access by using technologies such as Bluetooth, IrDA, Home RF, ZigBee or Ultra-Wideband Radio (UWB). In the embodiments of the present disclosure, it is illustrated by taking the first device as a smart home device having an image perception function such as a smart door lock, a smart visual doorbell, and a smart cat eye. However, the present disclosure is not limited thereto; according to actual situations, the first device may also be other device, for example, the first device may be a device having no image perception function such as an infrared sensing device, or the first device may be a smart community device, a smart park device, a smart factory device, etc.

As shown in FIG. 1, step S11 includes: acquiring a content acquisition response sent by the first device. For example, the content acquisition response includes a first content acquired by the first device.

For example, the server side may acquire identification information of the first device, so that the server side may interact with the first device based on the identification information of the first device, for example, sending a content acquisition request to the first device. After the first device receives the content acquisition request, the first device may process the same based on the content acquisition request to acquire a corresponding content, for example, the first content, etc.

For example, specific forms of the content acquisition request and the content acquisition response may be set according to actual situations, which will not be limited in the embodiments of the present disclosure. In addition, a mode of communication between the first device and the server side may be wireless communication and/or wired communication, etc., which will not be limited in the embodiments of the present disclosure.

As shown in FIG. 1, step S12 includes: judging whether the first content meets a privacy protection rule. In response to the first content not meeting the privacy protection rule, executing step S13: performing device configuration on the first device. In response to the first content meeting the privacy protection rule, there is no need to perform device configuration on the first device.

For example, the privacy protection rule correspond to the first device with each other; and in some examples, one privacy protection rule may be set for the first device, the privacy protection rule may be applicable to all application scenarios; in other examples, a variety of privacy protection rules may be set for the first device, the variety of privacy protection rules respectively correspond to different application scenarios, the variety of privacy protection rules may be different from each other, and at least some of the variety of privacy protection rules may also be the same.

For example, in some embodiments, before executing the step of performing device configuration on the first device, the device configuration method further includes: sending a configuration adjustment confirmation request to a first terminal associated with the first device; and executing the step of performing device configuration on the first device, in response to receiving the configuration adjustment confirmation response sent from the first terminal.

For example, the first terminal may be a device associated with a user (e.g., a user who owns the first device) associated with the first device; the device configuration method may include sending the configuration adjustment confirmation request to the first terminal, for the user associated with the first device to view a specific content of device configuration performed on the first device, so that the user associated with the first device may decide whether to perform device configuration on the first device, or, decide which device configuration is performed on the first device (e.g., deactivating a certain function of the first device and/or adjusting a certain parameter or a specific value of the parameter of the first device), so as to prevent other user from maliciously tampering with the first device. Based on the configuration adjustment confirmation response, the specific content of device configuration performed on the first device may be determined.

For example, in some embodiments, after performing device configuration on the first device, the specific content of device configuration may be sent by the first device or the server side to the first terminal, so that the user associated with the first device may understand what adjustment has been made to the first device.

For example, the first terminal may be various mobile terminals, fixed terminals, etc., for example, the mobile terminal may be a mobile phone, a tablet personal computer, a portable computer, etc., and the fixed terminal may be a desktop computer, etc., which will not be limited in the embodiments of the present disclosure. An operating system of the first terminal may be Android system, IOS system, Harmony system, etc.

For example, the first terminal is also registered to the server side.

For example, in some embodiments, step S13 may include: configuring at least one first function of the first device, so that the first content acquired by the configured first device meets the privacy protection rule.

For example, the configuring at least one first function of the first device includes: configuring a function parameter of the at least one first function.

For example, function parameters of each first function include one or more of respective items below: enable switch, basic parameter, function activation time, function deactivation time, function trigger condition, etc. The function trigger condition may include time for activating/deactivating the function, position for activating/deactivating the function, and so on. The basic parameter of the first function may represent a parameter related to the first function per se; for example, if the first function is an image shoot function, the basic parameter of the image shoot function may include: focal length, exposure, etc.; if the first function is an object sensing function, the basic parameter of the object sensing function includes: sensing distance, sensing angle, etc. An enable switch of each first function represents a switch for activating/deactivating the first function.

It should be noted that in the embodiment of the present disclosure, the "configuring at least one first function of the first device" may represent configuring any information related to the at least one first function, for example, the function parameters of the first function; or may also represent activating/deactivating the at least one first function.

For example, in some embodiments, the at least one first function includes a first image shoot function. When the first device is installed on a door, the first device may capture images within a certain spatial range corresponding to the door.

For example, in some embodiments, in step S13, the configuring at least one first function of the first device, includes: configuring the first image shoot function.

For example, in other embodiments, at least one first function may include a first image shoot function and a first object sensing function. The first image shoot function is activated or deactivated according to the first object sensing function. For example, when the first object sensing function senses an object, the first image shoot function is triggered to capture an image. That is to say, the first object sensing function senses that the object may be a function trigger condition for the first image shoot function.

In step S13, the configuring at least one first function of the first device, includes: configuring a first image shoot function and/or a first object sensing function.

For example, as shown in FIG. 2A and FIG. 2B, the first device 200 may further include an image acquiring module 203; and the image acquiring module 203 is configured to implement the first image shoot function, that is, the image acquiring module 203 may capture videos or pictures.

For example, in a case where the first device has the first image shoot function, the first content includes static image information and/or dynamic image information acquired by the image acquiring module; and the privacy protection rule includes that: the static image information and/or the dynamic image information does not include a privacy concern object, and/or clarity of a portion of the static image information and/or the dynamic image information that includes the privacy concern object is less than a clarity threshold. It should be noted that the clarity threshold may be set according to actual situations, which will not be limited in the embodiments of the present disclosure.

For example, in some embodiments, the privacy concern object may include at least one of various objects below: doors, elevators, stairs, corridors, and persons. For example, a person may be anyone that the first device may capture, and in some examples, a person may be a neighbor, etc. of a user associated with the first device (e.g., a user who owns the first device); the neighbor may be a resident located on a same floor as the user, or a resident located in a same building as the user.

In some embodiments of the present disclosure, the privacy concern object may be a neighbor of a user associated with the first device; so in the device configuration method provided by the present disclosure, it is determined whether the first device records or can record privacy information of the neighbor, and in a case where the first device records or can record privacy information of neighbor, device configuration may be performed on the first device, so as to avoid infringing on the neighbor's privacy and improve information security.

For example, the function parameters of the first image shoot function include a shooting distance corresponding to the image acquiring module.

For example, in step S13, the configuring the first image shoot function, includes: adjusting time for the image acquiring module of the first device to capture the object, so as to limit the first image shoot function in terms of usage time; and/or adjusting the shooting distance corresponding to the image acquiring module, to make the clarity of an image within a predetermined range including the privacy concern object less than the clarity threshold (i.e., blurring the image within the predetermined range including the privacy concern object) or make a content captured by the image acquiring module exclude the privacy concern object.

For example, the shooting distance corresponding to the image acquiring module 203 may be adjusted to limit the first image shoot function in terms of usage space. For example, the clarity of an image within the predetermined range including the privacy concern object may be made less than the clarity threshold, so that the privacy concern object in the image (a picture or a video) captured by the image acquiring module 203 cannot be recognized or accurately recognized, or, the content captured by the image acquiring module 203 is made exclude the privacy concern object, that is, the image acquiring module 203 is made incapable of capturing an image including the privacy concern object; or, the content captured by the image acquiring module 203 may be made only include a portion of the privacy concern object, and the privacy concern object cannot be recognized based on the portion of the privacy concern object.

For example, the image acquiring module 203 may include a camera; and the shooting distance may be a focal length of the camera. The predetermined range may be set according to actual situations, which will not be specifically limited in the present disclosure.

For example, in some embodiments, time for the image acquiring module of the first device to capture an object (e.g., a privacy concern object) may be adjusted, so as to limit the first image shoot function in terms of usage time. In some examples, if the privacy concern object is a person, time for the first device to capture the object may be adjusted based on time when the privacy concern object passes through a corresponding shooting range of the first device, to avoid the first device from capturing the privacy concern object; for example, within a certain time period (e.g., 8 to 9 am and 18 to 19 pm), the privacy concern object may pass through the corresponding shooting range of the first device, then time for the first device to capture the object may be adjusted, so that the first image shoot function of the first device is deactivated within the time period, so as to avoid capturing the privacy concern object.

For example, in step S13, the configuring the first image shoot function further includes: deactivating the first image shoot function, so as to limit the first image shoot function in terms of usage time.

For example, in step S13, the configuring the first image shoot function further includes: configuring the first object sensing function (i.e., configuring a function trigger condition for the first image shoot function) to configure the first image shoot function. For example, a sensing range of the first object sensing function may be limited, so as to limit the first image shoot function in terms of usage space.

For example, in some embodiments, the first device may include a plurality of inductive sensors for implementing the first object sensing function; for example, as shown in FIG. 2A, the first device 200 includes a first inductive sensor 201 and a second inductive sensor 202 for implementing the first object sensing function. For example, the first inductive sensor 201 and the second inductive sensor 202 are integrated on the first device 200. For example, the first inductive sensor 201 and the second inductive sensor 202 may be infrared sensors, for example, Passive Infrared Ray (PIR); however, the present disclosure is not limited thereto; the first inductive sensor 201 and the second inductive sensor 202 may also be any sensors that may sense a privacy concern object; the first inductive sensor 201 and the second inductive sensor 202 may be sensors of a same type, or may also be sensors of different types. It should be noted that in following description of the present disclosure, both the first inductive sensor 201 and the second inductive sensor 202 are taken as PIR.

Figure 3:
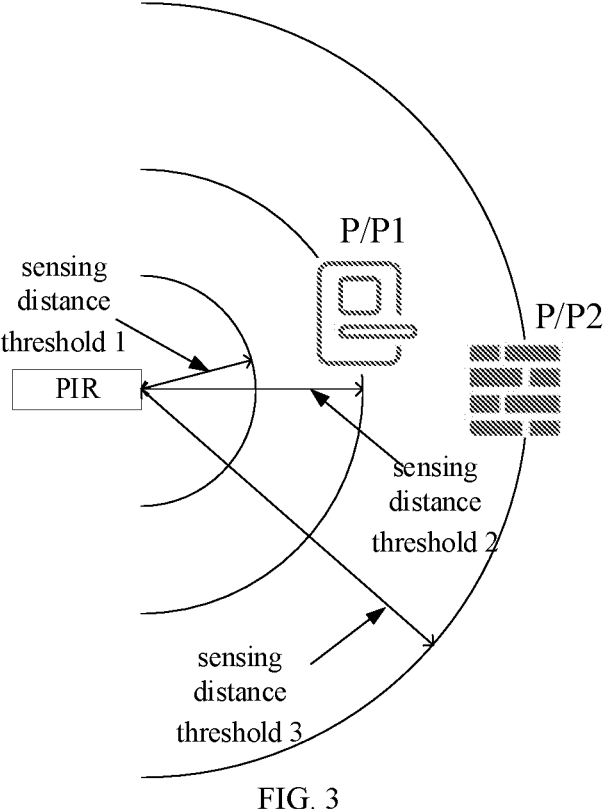
FIG. 3 is a schematic diagram of a sensing distance corresponding to an inductive sensor provided by at least one embodiment of the present disclosure.

For example, a sensing distance of the PIR is adjustable; currently, the PIR has a variety of sensing distances (the variety of sensing distances may include about 1 meter, about 1.5 meters, about 2 meters, etc.); the sensing distance of the PIR is a radial walking distance, that is, a distance that the PIR may sense when a person is walking in a radial direction towards a smart home device installed with the PIR. FIG. 3 shows an example of a sensing distance of a PIR. As shown in FIG. 3, the PIR may have a sensing distance threshold 1, a sensing distance threshold 2, and a sensing distance threshold 3; the sensing distance threshold 2 is greater than the sensing distance threshold 1 and less than the sensing distance threshold 3; according to actual needs, the current sensing distance corresponding to the PIR may be adjusted to the sensing distance threshold 1, the sensing distance threshold 2, the sensing distance threshold 3, or other suitable distances. For example, a sensing range corresponding to the PIR may be a semi-circular region with the sensing distance thereof as a radius and the PIR as a center. For example, if the current sensing distance corresponding to the PIR is the sensing distance threshold 1, then the current sensing range corresponding to the PIR is a semi-circular region with the sensing distance threshold 1 as a radius and the PIR as a center, and so on.

As shown in FIG. 3, a privacy concern object P may be a door P1, a wall P2, etc.

For example, in the example shown in FIG. 2A, the function parameters of the first object sensing function include a sensing distance corresponding to the first inductive sensor and a sensing distance corresponding to the second inductive sensor. In step S13, the configuring the first object sensing function includes: configuring the sensing distance corresponding to the first inductive sensor and/or the sensing distance corresponding to the second inductive sensor.

For example, in other embodiments, the first device may only include one inductive sensor for implementing the first object sensing function; for example, as shown in FIG. 2B, the first device 200 may only include the first inductive sensor 201 for implementing the first object sensing function. For example, the first inductive sensor 201 is integrated on the first device 200.

For example, in the example shown in FIG. 2B, the function parameter of the first object sensing function includes the sensing distance corresponding to the first inductive sensor. In step S13, the configuring the first object sensing function includes: configuring the sensing distance corresponding to the first inductive sensor.

It should be noted that relevant description below may be referred to for "configuring the sensing distance corresponding to the first inductive sensor" and "configuring the sensing distance corresponding to the second inductive sensor", or configuration may be performed according to actual situations, as long as it is ensured that the first content acquired by the configured first device meets the privacy protection rule.

For example, in some embodiments, at least one first function includes a first image shoot function, a first object sensing function, and a first snapping function; and the first snapping function is implemented based on the first object sensing function triggering the first image shoot function. For example, in step S13, the configuring at least one first function of the first device, includes: configuring the first snapping function and/or the first object sensing function.

For example, in some embodiments, in step S13, the configuring the first snapping function and/or the first object sensing function, includes: configuring the first snapping function, and/or configuring the sensing distance corresponding to the first inductive sensor and/or the sensing distance corresponding to the second inductive sensor.

For example, as shown in FIG. 2A, the first device 200 includes the first inductive sensor 201 and the second inductive sensor 202 for implementing the first object sensing function; the first snapping function includes a first pedestrian pass-by snapping function and a first hover snapping function; the first pedestrian pass-by snapping function indicates capturing a picture or a video when sensing a pedestrian passing by a corresponding shooting range of the first device; the first hover snapping function indicates capturing a picture or a video when sensing a pedestrian hovering within the shooting range corresponding to the first device (e.g., the pedestrian staying within the shooting range corresponding to the first device for a duration exceeding a certain threshold).

For example, the first pedestrian pass-by snapping function is implemented based on sensing data of the first inductive sensor triggering the first image shoot function, that is, the first pedestrian pass-by snapping function may be implemented by activating or deactivating the first image shoot function based on the sensing data of the first inductive sensor. The first hover snapping function is implemented based on sensing data of the second inductive sensor triggering the first image shoot function, that is, the first hover snapping function may be implemented by activating or deactivating the first image shoot function based on the sensing data of the second inductive sensor.

For example, in some embodiments, in step S13, the configuring the first snapping function and/or the first object sensing function, includes: determining a first current sensing distance and a first sensing distance threshold corresponding to the first inductive sensor, and a second current sensing distance corresponding to the second inductive sensor; determining an object distance between the first device and the privacy concern object; adjusting the first current sensing distance in response to a product of the object distance and a preset parameter being greater than the first sensing distance threshold, so that the adjusted first current sensing distance is less than the product of the object distance and the preset parameter; deactivating the first pedestrian pass-by snapping function in response to the product of the object distance and the preset parameter being less than or equal to the first sensing distance threshold, and the product of the object distance and the preset parameter being greater than the second current sensing distance; determining the second sensing distance threshold corresponding to the second inductive sensor, in response to the product of the object distance and the preset parameter being less than or equal to the first sensing distance threshold, and the product of the object distance and the preset parameter being less than or equal to the second current sensing distance; adjusting the second current sensing distance in response to the product of the object distance and the preset parameter being greater than the second sensing distance threshold, so that the adjusted second current sensing distance is less than the product of the object distance and the preset parameter, and deactivating the first pedestrian pass-by snapping function; and deactivating the first pedestrian pass-by snapping function and the first hover snapping function, in response to the product of the object distance and the preset parameter being less than or equal to the second sensing distance threshold.

It should be noted that in the embodiment of the present disclosure, the corresponding function may also be deactivated when only adjusting the sensing distance. For example, in response to the product of the object distance and the preset parameter being greater than the first sensing distance threshold, the first current sensing distance is adjusted so that the adjusted first current sensing distance is less than the product of the object distance and the preset parameter, and meanwhile, the first pedestrian pass-by snapping function may also be deactivated.

Figure 4A:
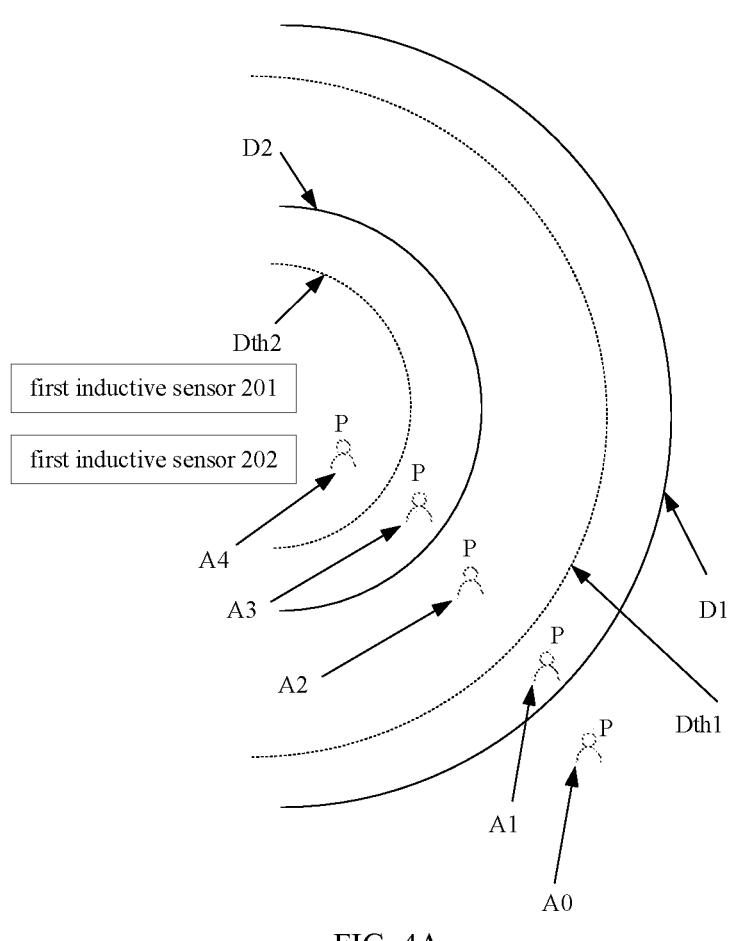
FIG. 4A is a schematic diagram of a sensing distance corresponding to a first inductive sensor and a sensing distance corresponding to a second inductive sensor provided by some embodiments of the present disclosure.

FIG. 4A is a schematic diagram of the sensing distance corresponding to the first inductive sensor and the sensing distance corresponding to the second inductive sensor provided by some embodiments of the present disclosure.

For example, as shown in FIG. 4A, a second current sensing distance D2 corresponding to the second inductive sensor 202 is less than a first current sensing distance D1 corresponding to the first inductive sensor 201, that is to say, the current sensing range corresponding to the second inductive sensor 202 is less than the current sensing range corresponding to the first inductive sensor 201.

For example, a sensing distance threshold corresponding to the first inductive sensor 201 and a sensing distance threshold corresponding to the second inductive sensor 202 may be at least partially different. As shown in FIG. 4A, a first sensing distance threshold Dth1 is a distance corresponding to a minimum sensing range of the first inductive sensor 201 when sensing an object, that is, the first sensing distance threshold Dth1 is a minimum sensing distance threshold corresponding to the first inductive sensor 201, and the second sensing distance threshold Dth2 is a distance corresponding to a minimum sensing range of the second inductive sensor 202 when sensing an object, that is, the second sensing distance threshold Dth2 is a minimum sensing distance threshold corresponding to the second inductive sensor 202; and the second sensing distance threshold Dth2 is less than the first sensing distance threshold Dth1.

For example, the preset parameter may be a constant within a range of ⅓ to 1, including ⅓ and 1. For example, the preset parameter may be ⅓, ½, or 1, etc.

For example, as shown in FIG. 4A, in some examples, the privacy concern object P is a person.

As shown in FIG. 4A, in a case where the product of the object distance and the preset parameter is greater than the first sensing distance threshold Dth1 and less than the first current sensing distance D1, that is, when the privacy concern object P is located in position A1, the first current sensing distance D1 may be adjusted to make the adjusted first current sensing distance less than the product of the object distance and the preset parameter, so that the privacy concern object P is located outside the sensing range corresponding to the first inductive sensor 201, to avoid the first inductive sensor 201 from sensing the privacy concern object P. For example, the adjusted first current sensing distance may be the first sensing distance threshold Dth1, or may also be greater than the first sensing distance threshold Dth1; and an actual value of the adjusted first current sensing distance may be set according to actual situations.

As shown in FIG. 4A, in a case where the product of the object distance and the preset parameter is less than or equal to the first sensing distance threshold Dth1 and greater than the second current sensing distance D2, that is, when the privacy concern object P is located in position A2, even if the first current sensing distance D1 corresponding to the first inductive sensor 201 is adjusted to a minimum value, that is, adjusted to the first sensing distance threshold Dth1, the first inductive sensor 201 is still capable of sensing the privacy concern object P, so the first pedestrian pass-by snapping function needs to be deactivated; at this time, even if the first inductive sensor 201 senses the privacy concern object P, the first device may not capture a picture and/or a video including the privacy concern object P, that is to say, even if the first inductive sensor 201 senses the privacy concern object P, the first image shoot function is not be triggered, and will not implement the first pedestrian pass-by snapping function. At this time, because the product of the object distance and the preset parameter is greater than the second current sensing distance D2, that is, the privacy concern object P is located outside the sensing range corresponding to the second inductive sensor 202, the second inductive sensor 202 may not sense the privacy concern object P. In such case, the first hover snapping function is still in an activated state, so an object hovering within the sensing range of the second inductive sensor 202 may be detected, so as to improve safety.

As shown in FIG. 4A, in a case where the product of the object distance and the preset parameter is less than or equal to the first sensing distance threshold Dth1 and less than or equal to the second current sensing distance D2, a relationship between the product of the object distance and the preset parameter and the second sensing distance threshold Dth2 may be further judged; in a case where the product of the object distance and the preset parameter is greater than the second sensing distance threshold Dth2, that is, when the privacy concern object P is located in position A3, even if the first current sensing distance D1 corresponding to the first inductive sensor 201 is adjusted to a minimum value, that is, adjusted to the first sensing distance threshold Dth1, the first inductive sensor 201 is still capable of sensing the privacy concern object P, so the first pedestrian pass-by snapping function needs to be deactivated; in addition, the second current sensing distance D2 also needs to be adjusted so that the adjusted second current sensing distance is less than the product of the object distance and the preset parameter, so that the privacy concern object Pis located outside the sensing range corresponding to the second inductive sensor 202, to avoid the second inductive sensor 202 from sensing the privacy concern object P. For example, the adjusted second current sensing distance may be the second sensing distance threshold Dth2, or may also be greater than the second sensing distance threshold Dth2, which may be set according to actual situations. In such case, the first hover snapping function is still in an activated state, so an object hovering within the sensing range of the second inductive sensor 202 may be detected, so as to improve safety.

As shown in FIG. 4A, when the product of the object distance and the preset parameter is less than or equal to the second sensing distance threshold Dth2, that is, when the privacy concern object P is located in position A4; at this time, even if the first current sensing distance D1 corresponding to the first inductive sensor 201 is adjusted to a minimum value, that is, adjusted to the first sensing distance threshold Dth1, the first inductive sensor 201 is still capable of sensing the privacy concern object P, even if the second current sensing distance D2 corresponding to the second inductive sensor 202 is adjusted to a minimum value, that is, adjusted to the second sensing distance threshold Dth2, the second inductive sensor 202 is still capable of sensing the privacy concern objects P, so the first pedestrian pass-by snapping function and the first hover snapping function need to be deactivated.

For example, as shown in FIG. 4A, in a case where the product of the object distance and the preset parameter is greater than the first current sensing distance D1, that is, when the privacy concern object P is located in position A0; at this time, the privacy concern object P is located outside the sensing range corresponding to the first inductive sensor 201 and the sensing range corresponding to the second inductive sensor 202; at this time, the image shooting range corresponding to the first device excludes the privacy concern object P, so the parameters of the first inductive sensor 201 (e.g., the first current sensing distance) and the parameters of the second inductive sensor 202 (e.g., the second current sensing distance) may be kept unchanged.

It should be noted that the first device 200 may further include more (e.g., three, four, etc.) inductive sensors, which may be set according to actual situations.

For example, in some embodiments, in step S13, the configuring the first snapping function and/or the first object sensing function, includes: configuring the first snapping function, and/or configuring the sensing distance corresponding to the first inductive sensor.

For example, as shown in FIG. 2B, the first device 200 includes the first inductive sensor 201 for implementing the first object sensing function; the first snapping function includes the first pedestrian pass-by snapping function; the first pedestrian pass-by snapping function is implemented based on the sensing data of the first inductive sensor triggering the first image shoot function, that is, the first pedestrian pass-by snapping function is implemented based on the sensing data of the first inductive sensor 201 to activate or deactivate the first image shoot function. It should be noted that at this time, if the first snapping function further includes the first hover snapping function, the first hover snapping function may also be implemented based on the sensing data of the first inductive sensor 201 activating or deactivating the first image shoot function.

For example, in some embodiments, in step S13, the configuring the first snapping function and/or the first object sensing function, includes: determining the first current sensing distance and the first sensing distance threshold corresponding to the first inductive sensor; determining the object distance between the first device and the privacy concern object; deactivating the first pedestrian pass-by snapping function, in response to the product of the object distance and the preset parameter being less than or equal to the first sensing distance threshold; adjusting the first current sensing distance in response to the product of the object distance and the preset parameter being greater than the first sensing distance threshold, so that the adjusted first current sensing distance is less than the product of the object distance and the preset parameter.

Figure 4B:
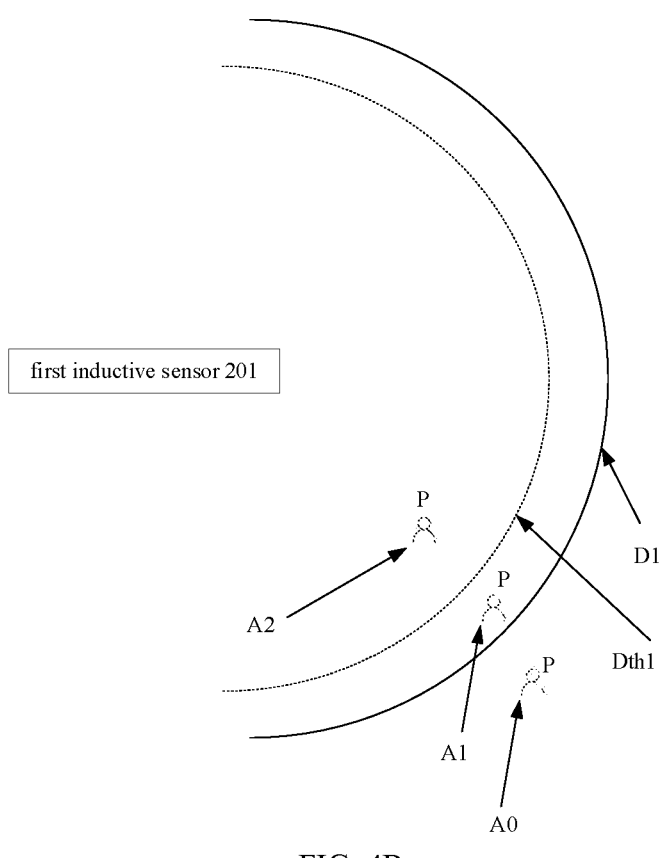
FIG. 4B is a schematic diagram of the sensing distance corresponding to the first inductive sensor provided by some embodiments of the present disclosure.

FIG. 4B is a schematic diagram of the sensing distance corresponding to the first inductive sensor provided by some embodiments of the present disclosure.

For example, as shown in FIG. 4B, the first sensing distance threshold Dth1 is a distance corresponding to the minimum sensing range of the first inductive sensor 201 when sensing an object, that is, the first sensing distance threshold Dth1 is the minimum sensing distance threshold corresponding to the first inductive sensor 201.

For example, as shown in FIG. 4B, in some examples, the privacy concern object P is a person.

As shown in FIG. 4B, in a case where the product of the object distance and the preset parameter is less than or equal to the first sensing distance threshold Dth1, that is, when the privacy concern object P is located in position A2, even if the first current sensing distance D1 corresponding to the first inductive sensor 201 is adjusted to a minimum value, that is, adjusted to the first sensing distance threshold Dth1, the first inductive sensor 201 is still capable of sensing the privacy concern objects P, so the first pedestrian pass-by snapping function needs to be deactivated; at this time, even if the first inductive sensor 201 senses the privacy concern object P, the first device does not capture a picture and/or a video including the privacy concern object P, that is to say, even if the first inductive sensor 201 senses the privacy concern object P, the first image shoot function will not be triggered, and thus will not implement the first pedestrian pass-by snapping function. For example, when the privacy concern object is a person, the privacy concern object generally does not hover within the shooting range corresponding to the first device, so when the first hover snapping function may also be activated or deactivated based on the sensing data of the first inductive sensor 201, the first hover snapping function may not be deactivated, or the first hover snapping function may also be deactivated.

As shown in FIG. 4B, in a case where the product of the object distance and the preset parameter is greater than the first sensing distance threshold Dth1 and less than or equal to the first current sensing distance D1, that is, when the privacy concern object P is located in position A1, the first current sensing distance D1 is adjusted so that the adjusted first current sensing distance is less than the product of the object distance and the preset parameter.

For example, as shown in FIG. 4B, in a case where the product of the object distance and the preset parameter is greater than the first current sensing distance D1, that is, when the privacy concern object P is located in position A0, the privacy concern object P is located outside the sensing range corresponding to the first inductive sensor 201; at this time, the image shooting range corresponding to the first device excludes the privacy concern object P, so the parameters of the first inductive sensor 201 (e.g., the first current sensing distance D1) may be kept unchanged.

For example, in some embodiments, the server side has a second device corresponding thereto; the second device is registered to the server side; the second device has at least one second function; the at least one second function includes a second image shoot function and a second object sensing function; and the second image shoot function is activated or deactivated according to the second object sensing function. The second device may also be a smart home device such as a smart door lock, a smart visual doorbell, and a smart cat eye. The first device and the second device may be the same (e.g., have a same function, be products of a same model, etc.), or may also be different (e.g., have different functions, be products of different models, etc.); for example, the first device and the second device may be two devices of a same model of a same brand, or may also be two devices of a same model of different brands, or may also be two devices of different brands, which will not be limited in the embodiments of the present disclosure.

It should be noted that in other embodiments, the second device is registered to a server other than the above-described server side; and the above-described server side may have corresponding permissions to acquire relevant information of the second device.

FIG. 2C is a schematic block diagram of a second device provided by at least one embodiment of the present disclosure.

For example, as shown in FIG. 2A and FIG. 2B, the first device 200 includes a first inductive sensor 201 for implementing the first object sensing function. As shown in FIG. 2C, the second device 300 includes a third inductive sensor 301 for implementing the second object sensing function; for example, the third inductive sensor 301 may also be an infrared sensor, for example, a passive infrared ray. For example, the first snapping function may include a first pedestrian pass-by snapping function; the first pedestrian pass-by snapping function is implemented based on the sensing data of the first inductive sensor triggering the first image shoot function. At least one second function further includes a second pedestrian pass-by snapping function; the second pedestrian pass-by snapping function is implemented based on the second object sensing function triggering the second image shoot function; for example, the second pedestrian pass-by snapping function is implemented based on sensing data of the third inductive sensor triggering the second image shoot function. It should be noted that the first pedestrian pass-by snapping function and the second pedestrian pass-by snapping function may be the same or different (e.g., parameters (e.g., sensing distances) are different, etc.).

It should be noted that although in the embodiment of FIG. 2C, the second device 300 only includes one inductive sensor, the embodiment of the present disclosure is not limited thereto; the second device 300 may include a plurality of inductive sensors, as shown in FIG. 2C, the second device 300 may further include an image acquiring device 303; and specific structures and functions of the second device which will not be limited in the embodiments of the present disclosure.

For example, in a case of where the server side has a second device corresponding thereto, the device configuration method further includes: performing device configuration on the second device, in response to the first content not meeting the privacy protection rule. For example, the performing device configuration on the second device, includes: configuring at least one second function of the second device, so that the first content acquired by the first device meets the privacy protection rule after device configuration is performed on the second device. It should be noted that the above-described mode of performing device configuration on the first device is also applicable to device configuration on the second device without contradiction.

For example, in some embodiments, in a case where the first content does not meet the privacy protection rule, device configuration may only be performed on the first device or the second device, or device configuration may be performed on both the first device and the second device.

For example, in some embodiments, in step S13, the configuring the first snapping function and/or the first object sensing function, includes: determining the first current sensing distance and the first sensing distance threshold corresponding to the first inductive sensor, as well as a third current sensing distance and a third sensing distance threshold corresponding to the third inductive sensor; determining a device distance between the first device and the second device; adjusting the first current sensing distance, in response to a sum of the first sensing distance threshold and the third sensing distance threshold being less than or equal to the device distance, so that there is no overlapping sensing region between the first inductive sensor and the third inductive sensor; and deactivating the first pedestrian pass-by snapping function, in response to the sum of the first sensing distance threshold and the third sensing distance threshold being greater than the device distance.

Figure 5:
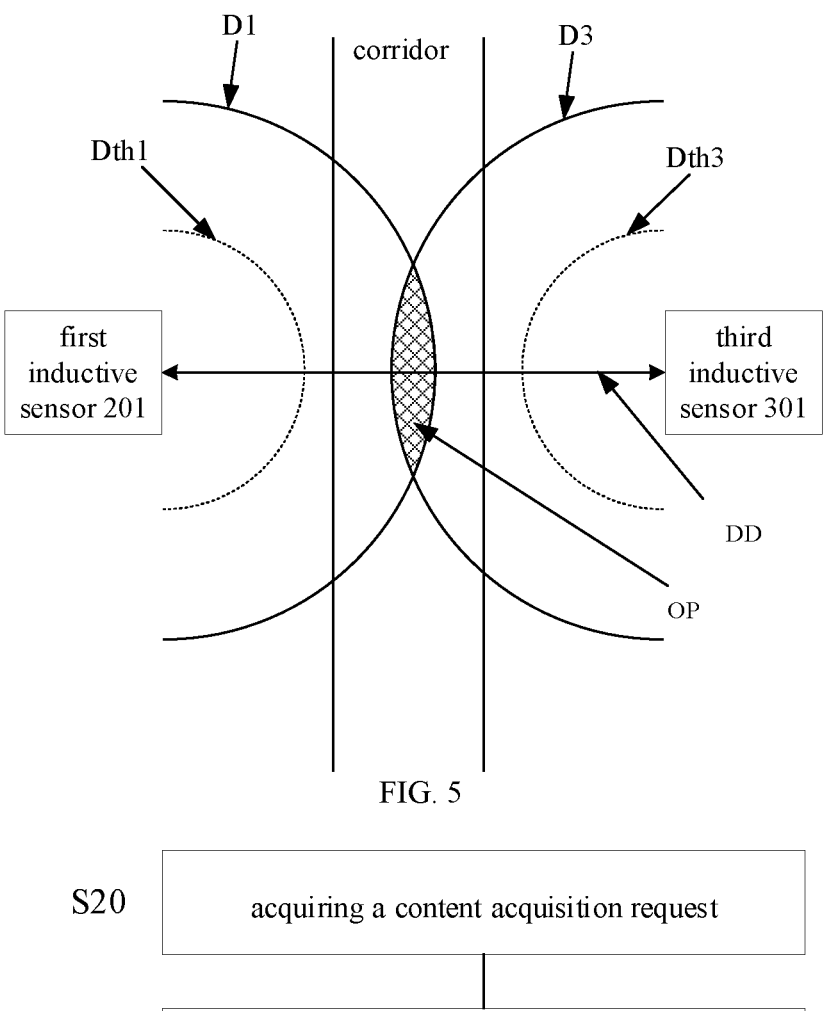
FIG. 5 is a schematic diagram of the sensing distance corresponding to the first inductive sensor and a sensing distance corresponding to a third inductive sensor provided by some embodiments of the present disclosure.

FIG. 5 is a schematic diagram of the sensing distance corresponding to the first inductive sensor and the sensing distance corresponding to the third inductive sensor provided by some embodiments of the present disclosure.

For example, the sensing distance threshold corresponding to the first inductive sensor 201 and the sensing distance threshold corresponding to the third inductive sensor 301 may be the same or at least partially different. As shown in FIG. 5, the first sensing distance threshold Dth1 is a distance corresponding to a minimum sensing range of the first inductive sensor 201 when sensing an object, that is, the first sensing distance threshold Dth1 is a minimum sensing distance threshold corresponding to the first inductive sensor 201; and the third sensing distance threshold Dth3 is a distance corresponding to a minimum sensing range of the third inductive sensor 301 when sensing an object, that is, the third sensing distance threshold Dth3 is a minimum sensing distance threshold corresponding to the third inductive sensor 301. The first sensing distance threshold Dth1 and the third sensing distance threshold Dth3 may be the same or different.

For example, in some embodiments, the performing device configuration on the second device, includes: adjusting the third current sensing distance, in response to the sum of the first sensing distance threshold and the third sensing distance threshold being less than or equal to the device distance, so that there is no overlapping sensing region between the first inductive sensor and the third inductive sensor; deactivating the second pedestrian pass-by snapping function, in response to the sum of the first sensing distance threshold and the third sensing distance threshold being greater than the device distance.

For example, as shown in FIG. 5, in some examples, the privacy concern object is a person; and the device distance between the first device and the second device may be a distance DD between the first inductive sensor 201 and the third inductive sensor 301.

For example, in a case where the sum of the first sensing distance threshold Dth1 and the third sensing distance threshold Dth3 is less than or equal to the device distance DD, at this time, if there is an overlapping sensing region between the first inductive sensor and the third inductive sensor, the first current sensing distance D1 and/or the third current sensing distance D3 may be adjusted so that there is no overlapping sensing region between the first inductive sensor 201 and the third inductive sensor 301, so the first content acquired by the configured first device meets the privacy protection rule (i.e., in a case where the first content includes static image information and/or dynamic image information acquired by the image acquiring module, the privacy protection rule include that the static image information and/or the dynamic image information does not include the privacy concern object, and/or a clarity of a portion of the static image information and/or the dynamic image information that includes the privacy concern object is less than the clarity threshold), so as to avoid infringing on privacy of the privacy concern object; if there is no overlapping sensing region between the first inductive sensor and the third inductive sensor, the parameters of the first inductive sensor 201 (e.g., the first current sensing distance D1) and parameters of the third inductive sensor 301 (e.g., the third current sensing distance D3) may be kept unchanged. For example, as shown in FIG. 5, if the sum of the first current sensing distance D1 and the third current sensing distance D3 is greater than the device distance DD, then the first current sensing distance D1 and the third current sensing distance D3 overlap with each other, forming an overlapping sensing region OP; at this time, the first current sensing distance D1 and/or the third current sensing distance D3 may be adjusted, so that no overlapping sensing region exists between the first inductive sensor 201 and the third inductive sensor 301; for example, in the example shown in FIG. 5, the first current sensing distance D1 may be adjusted to the first sensing distance threshold Dth1, so that no overlapping sensing region exists between the first inductive sensor 201 and the third inductive sensor 301; or, the third current sensing distance D3 may be adjusted to the third sensing distance threshold Dth3, so that there is no overlapping sensing region between the first inductive sensor 201 and the third inductive sensor 301; or, the first current sensing distance D1 may be adjusted to the first sensing distance threshold Dth1, and the third current sensing distance D3 may be adjusted to the third sensing distance threshold Dth3, so that there is no overlapping sensing region between the first inductive sensor 201 and the third inductive sensor 301. If the sum of the first current sensing distance D1 and the third current sensing distance D3 is less than or equal to the device distance DD, then there is no overlapping sensing region between the first current sensing distance D1 and the third current sensing distance D3, so the first current sensing distance D1 and the third current sensing distance D3 may be kept unchanged.

For example, in a case where the sum of the first sensing distance threshold Dth1 and the third sensing distance threshold Dth3 is greater than the device distance, even if the first current sensing distance D1 corresponding to the first inductive sensor 201 is adjusted to a minimum value, that is, adjusted to the first sensing distance threshold Dth1, and the third current sensing distance D3 corresponding to the third inductive sensor 301 is adjusted to a minimum value, that is, adjusted to the third sensing distance threshold Dth3, there is still an overlapping sensing region between the first inductive sensor 201 and the third inductive sensor 301. Because the first device 200 and the second device 300 respectively belong to different users, when the privacy concern object is located in the overlapping sensing region, both the first device 200 and the second device 300 are capable of capturing videos and/or pictures of the privacy concern object, so, the first device 200 and/or the second device 300 infringe on privacy of the privacy concern object; when privacy concern object is a user associated with the first device 200, the second device 300 infringes on privacy of the privacy concern object; when the privacy concern object is a user associated with the second device 300, the first device 200 infringes on privacy of the privacy concern object; when the privacy concern object is a user other than the user associated with the first device 200 and the user associated with the second device 300, the first device 200 and/or the second device 300 infringe on privacy of the privacy concern object. Therefore, in such case, the first pedestrian pass-by snapping function and/or the second pedestrian pass-by snapping function may be directly deactivated, so as to avoid the first device 200 and second device 300 from simultaneously acquiring information including the privacy concern object.

For example, as shown in FIG. 5, the overlapping sensing region OP is located in a corridor of a common region.

For example, in some embodiments, in step S13, the configuring at least one first function of the first device, includes: in response to receiving a function configuration request sent from a second terminal; configuring at least one first function of the first device, based on the function configuration request; and sending a function configuration response to the second terminal, after configuring the at least one first function of the first device. For example, in this embodiment, device configuration on the first device may be implemented based on the function configuration request; in some examples, the specific device configuration process may be automatically implemented by the server side; at this time, the relevant description of step S13 in the above-described embodiment may be referred to for the step of "configuring at least one first function of the first device" to be executed by the server side, and no details will be repeated; in other examples, the server directly performs device configuration on the first device, directly based on the function configuration request, that is, the server side directly deactivates the first function that needs to be deactivated and/or directly adjusts the function parameter corresponding to the first device that needs to be adjusted, based on the first function that needs to be deactivated and/or the function parameter that needs to be adjusted in the function configuration request; for example, when the function configuration request indicates deactivating the first pedestrian pass-by snapping function, the server side directly deactivates the first pedestrian pass-by snapping function after receiving the function configuration request, and sends a function configuration response to the second terminal after deactivating the first pedestrian pass-by snapping function.

For example, in some embodiments, the function configuration request indicates configuring at least one first function in a function list; and all functions in the function list are activated functions; for example, the functions in the function list are functions of the first device. For example, the function list includes at least one of functions below: a video call function, the image snapping function, first pedestrian pass-by snapping function, and the first hover snapping function, etc.

For example, in a case where a function configuration request indicates deactivating at least one first function in the function list, the function configuration request includes identification information of the first device (e.g., a device identification code) and a function identification code of at least one function (e.g., at least one first function); in a case where the function configuration request indicates adjusting at least one function parameter of the first device, the function configuration request includes the identification information of the first device and at least one function parameter (a specific value of the parameter, etc.) that needs to be adjusted.

For example, the function configuration response may include information such as a function identification code corresponding to the first function that has been adjusted (e.g., deactivated) and/or the function parameter that has been adjusted.

For example, a plurality of function options may be set at the second terminal for a user corresponding to the second terminal to choose from a plurality of function options, to generate a function configuration request, so as to standardize the function configuration request and avoid failure of the server side to recognize the function configuration request. Each function option may be deactivating XX function, adjusting XX parameter, deactivating XX function during XX time period, adjusting XX parameter to XX value, etc.; for another example, with respect to each function option, a specific parameter value (e.g., a specific time period during which the function is deactivated, a specific sensing distance of the sensor, etc.) may also be freely set by the user.

For example, the first terminal and the second terminal may be a same terminal, or the first terminal and the second terminal may be different terminals; at this time, the second terminal may be a device associated with a user different the user associated with the first device (e.g., a neighbor of the user associated with the first device, etc.), and the second terminal may also be various mobile terminals, fixed terminals, etc.

It should be noted that after receiving the function configuration response, if the first device is adjusted again, the response may be sent to the second terminal again to inform the second terminal of relevant situation of the first device; for example, the relevant situation may include information such as the function that has been adjusted again or the parameter that has been adjusted again, so that the user associated with the second terminal may know whether the first device adjusted again meets the privacy protection rule, and whether privacy of the user is infringed.

It should be noted that, without contradiction, the respective methods for performing device configuration on the first device as described in the respective embodiments of the present disclosure may be combined with each other, to meet requirements to not infringe on privacy.

For example, in some embodiments, in a case where the server side has a second device corresponding thereto, before executing the step of acquiring the identification information of the first device, and sending a content acquisition request to the first device (i.e. step S10), the device configuration method further includes: generating trigger information. At this time, the trigger information is generated by the server side. In some embodiments, the generating trigger information includes: receiving first address information corresponding to the first device and second address information corresponding to the second device; and generating the trigger information, in response to the first address information and second address information being identical.

For example, in some embodiments, the first address information is address information acquired by hashing original address information corresponding to the first device, and the second address information is address information acquired by hashing original address information corresponding to the second device, so as to ensure that the original address information is not sent to the server and avoid information leakage. For example, the original address information corresponding to the first device and the original address information corresponding to the second device at least need to be specific to floor; for example, both may be represented as floor XX, unit XX, building XX, community XX, or No. (door) XX, floor XX, unit XX, building XX, community XX, etc. It should be noted that the first address information may also be the original address information corresponding to the first device, and the second address information may also be the original address information corresponding to the second device.

For example, the first address information and the second address information should be in standard format to avoid failure to compare address information input by different users.

For example, when comparing the first address information and the second address information, in a case where both the first address information and the second address information are in plaintext, the first address information and the second address information may be directly compared in strings, or the first address information and the second address information may be semantically recognized before comparison; when the first address information and the second address information are hashed address information, the first address information and the second address information are compared in strings.

For example, in some embodiments, before executing the step of acquiring the identification information of the first device, and sending a content acquisition request to the first device, the device configuration method further includes: controlling the first device sending a test request, the test request includes a test signal and signal sending time; controlling the second device receiving the test request sent from the first device; and controlling the first device receiving a test response sent by the second device, and the test response includes signal receiving time.

For example, the test signal may include signals such as electromagnetic waves and light waves, etc. For example, the test response may further include the test signal.

For example, step S11 may include: acquiring the test request sent by the first device and the test response sent by the second device; and determining the first content in the content acquisition response, based on the test request and the test response. For example, the first content may include the test signal and the signal sending time in the test request, as well as the signal receiving time in the test response. Based on the first content, the device distance between the first device and the second device may be calculated.

For example, the first device has a first object sensing function, and the second device has a second object sensing function, as shown in FIG. 2A to FIG. 2C, in a case where the first content includes the test signal and the signal sending time in the test request, as well as the signal receiving time in the test response, the first device 200 includes the first inductive sensor 201 for implementing the first object sensing function, and the second device 300 includes the third inductive sensor 301 for implementing the second object sensing function, the privacy protection rule includes the first current sensing distance corresponding to the first inductive sensor 201 and the third current sensing distance corresponding to the third inductive sensor 301, and indicates that there is no overlapping sensing region between the first inductive sensor and the third inductive sensor.

For example, step S12 includes: determining the device distance between the first device and the second device based on transmission information and reception information; determining the device distance between the first device and the second device based on the test request and the test response in the first content; determining whether there is an overlapping sensing region between the first inductive sensor and the third inductive sensor, based on the first current sensing distance, the third current sensing distance, and the device distance; and determining that the first content does not meet the privacy protection rule, in response to there being an overlapping sensing region between the first inductive sensor and the third inductive sensor. For example, step S12 further includes: determining that the first content does not meet the privacy protection rule, when there is no overlapping sensing region between the first inductive sensor and the third inductive sensor.

It should be noted that the first current sensing distance corresponding to the first inductive sensor 201 and the third current sensing distance corresponding to the third inductive sensor 301 may also be acquired by the server side from the first device and the second device, instead of being included in the privacy protection rule. For example, the server side may send a sensing distance acquisition request to the first device and the second device, and receive a first sensing distance acquisition response sent by the first device and a second sensing distance acquisition response sent by the second device; for example, the first sensing distance acquisition response includes the first current sensing distance corresponding to the first inductive sensor 201; and the second sensing distance acquisition response includes the third current sensing distance corresponding to the third inductive sensor 301.

For example, the determining the device distance between the first device and the second device, based on the test request and the test response in the first content, may include: calculating a time difference between the signal sending time and the signal receiving time; determining a propagation speed of the test signal; calculating the device distance between the first device and the second device, based on the time difference and the propagation speed. For example, the device distance may be a product of the time difference and the propagation speed.

For example, as shown in FIG. 5, in some examples, the privacy concern object is a person, and the device distance between the first device and the second device may be the distance DD between the first inductive sensor 201 and the third inductive sensor 301. For example, as shown in FIG. 5, in a case where the sum of the first current sensing distance D1 and the third current sensing distance D3 is greater than the device distance, an overlapping sensing region OP exists between the first inductive sensor and the third inductive sensor, so as to determine that the first content does not meet the privacy protection rule; in a case where the sum of the first current sensing distance D1 and the third current sensing distance D3 is less than or equal to the device distance, there is no overlapping sensing region between the first inductive sensor and the third inductive sensor, so as to determine that the first content meets the privacy protection rule.

For example, in some embodiments, before executing the step of acquiring the identification information of the first device, and sending a content acquisition request to the first device, the device configuration method further includes: generating trigger information. At this time, the trigger information is generated by the server side.

For example, in some examples, the generating trigger information includes: acquiring image information, and the image information includes a video and/or a picture; analyzing the image information, to determine whether the image information includes a privacy concern object; and generating the trigger information, in response to the image information including the privacy concern object.

For example, the first device may further include an image acquiring module; and the image information may be information captured by the image acquiring module of the first device. For example, in some examples, the server side may send an instruction to the first device, to control the image acquiring module of the first device acquiring an image. For example, the acquiring image information may include: sending an image acquisition request to the first device, to control the image acquiring module on the first device acquiring image information; receiving an image acquisition response including the image information transmitted from the first device, so as to acquire the image information. For example, in other examples, the first device may also automatically control the image acquiring module thereof to acquire an image.

For example, the image information may be analyzed by using an object recognition technology based on neural networks, so as to determine whether the image information includes a privacy concern object.

For example, in other examples, the generating trigger information includes: receiving audio information and acquisition perspective information; and generating the trigger information, in response to the audio information including sound emitted by the privacy concern object, and the acquisition perspective information indicating that an acquisition perspective of the image acquiring module on the first device has not changed.

For example, the first device may further include an audio acquiring module, and audio information may be acquired by the audio acquiring module of the first device; for example, the audio acquiring module may include a sound sensor. The acquisition perspective information may be an acquisition perspective corresponding to the image acquiring module; for example, if the image acquiring module includes a camera, the acquisition perspective information may be a shooting perspective of the camera.

For example, in some examples, the server side may send an instruction to the first device, to control the audio acquiring module of the first device acquiring an audio, and control the first device acquiring the acquisition perspective information of the image acquiring module. For example, the receiving audio information and acquisition perspective information includes: sending an audio activation request to the first device to control the first device activating the audio acquiring module; receiving the audio information acquired by the audio acquiring module sent by the first device; sending a perspective acquisition request to the first device to control the first device acquiring acquisition perspective information of the image acquiring module; and receiving the acquisition perspective information. For example, in other examples, the first device may also automatically control the audio acquiring module thereof acquiring an audio and acquiring the acquisition perspective information of the image acquiring module.

For example, in other examples, the generating trigger information includes: receiving device location information; acquiring a scene structure of a location of the first device based on the device location information; and generating the trigger information, in response to the scene structure indicating that space corresponding to the first device includes the privacy concern object.

For example, the device location information may include address information corresponding to the first device. For example, information of scene structures corresponding to different address information may be pre-stored in the server side, so that a scene structure corresponding to the device location information may be directly acquired, based on the device location information.

For example, the scene structure may represent the apartment structure of the house and/or floor where the first device is located, and surrounding facility situations of the first device, for example, whether the first device is facing a privacy concern object, for example, a public facility (e.g., a corridor, an elevator, a stair) and a doorway of other user, etc. may be determined; and therefore, based on the scene structure, it may be determined whether the space corresponding to the first device includes a privacy concern object.

For example, in other examples, the generating trigger information includes: receiving input information; and generating the trigger information, in response to the input information indicating that the space corresponding to the first device includes a privacy concern object.

For example, the input information may be sent to the server side by the user associated with the first device. The input information may indicate whether the first device is facing a privacy concern object, for example, a public facility (e.g., a corridor, an elevator, a stair), and a doorway of other users.

For example, as shown in FIG. 2A, in a case where the first device 200 includes the first inductive sensor 201 and the second inductive sensor 202 for implementing the first object sensing function, the privacy protection rule includes that the privacy concern object is located outside the sensing range of the first inductive sensor 201 and/or the second inductive sensor 202, and the first content includes the first current sensing distance corresponding to the first inductive sensor, the second current sensing distance corresponding to the second inductive sensor 202, and the object distance between the first device and the privacy concern object. Step S12 includes: determining the first current sensing distance corresponding to the first inductive sensor, the second current sensing distance corresponding to the second inductive sensor, and the object distance between the first device and the privacy concern object, based on the first content, and the second current sensing distance is less than the first current sensing distance; determining that the first content does not meet the privacy protection rule, in response to the product of the object distance and the preset parameter being less than or equal to the first current sensing distance and/or the second current sensing distance. For example, step S12 further includes: determining that the first content meets the privacy protection rule, in response to the product of the object distance and the preset parameter being greater than the first current sensing distance and the second current sensing distance.

For example, as shown in FIG. 4A, in some examples, the privacy concern object P is a person.

In a case where both the first inductive sensor 201 and the second inductive sensor 202 are turned on, or the first inductive sensor 201 is turned on and the second inductive sensor 202 is turned off, as shown in FIG. 4A, in a case where the product of the object distance and the preset parameter is less than or equal to the first current sensing distance D1, that is, when the privacy concern object P is located in position A1, A2, A3 or A4, it is determined that the image shooting range corresponding to the first device (i.e. the sensing range corresponding to the first current sensing distance D1, i.e. a semicircular region with the first inductive sensor 201 as a circle center and the first current sensing distance D1 as a radius) includes the privacy concern object, i.e. the first content does not meet the privacy protection rule; in a case where the product of the object distance and the preset parameter is greater than the first current sensing distance D1, that is, when the privacy concern object P is located in position A0, it is determined that the image shooting range corresponding to the first device does not include the privacy concern object, that is, the first content meets the privacy protection rule.

In a case where the first inductive sensor 2012 is turned off and the second inductive sensor 202 is turned on, as shown in FIG. 4A, in a case where the product of the object distance and the preset parameter is less than or equal to the second current sensing distance D2, that is, when the privacy concern object P is located in position A3 or A4, it is determined that the image shooting range corresponding to the first device (i.e. the sensing range corresponding to the second current sensing distance D2, i.e. a semicircular region with the second inductive sensor 202 as a circle center and the second current sensing distance D2 as a radius) includes the privacy concern object, i.e. the first content does not meet the privacy protection rule; in a case where the product of the object distance and the preset parameter is greater than the second current sensing distance D2, that is, when the privacy concern object P is located in position A0, A1 or A2, it is determined that the image shooting range corresponding to the first device does not include the privacy concern object, that is, the first content meets the privacy protection rule.

For example, as shown in FIG. 4B, in a case where the first device 200 includes the first inductive sensor 201 for implementing the first object sensing function, the privacy protection rule includes that the privacy concern object is located outside the sensing range of the first inductive sensor 201, and the first content includes the first current sensing distance corresponding to the first inductive sensor, and the object distance between the first device and the privacy concern object. Step S12 includes: determining the first current sensing distance corresponding to the first inductive sensor and the object distance between the first device and the privacy concern object, based on the first content; determining that the first content does not meet the privacy protection rule, in response to the product of the object distance and the preset parameter being less than or equal to the first current sensing distance. For example, step S12 further includes: determining that the first content meets the privacy protection rule, in response to the object distance being greater than the first current sensing distance.

For example, as shown in FIG. 4B, in some examples, the privacy concern object P is a person.

In a case where the first inductive sensor 201 is turned on, as shown in FIG. 4B, in a case where the product of the object distance and the preset parameter is less than or equal to the first current sensing distance D1, that is, when the privacy concern object P is located in position A1 or A2, it is determined that the image shooting range corresponding to the first device (i.e. the sensing range corresponding to the first current sensing distance D1, i.e. a semicircular region with the first inductive sensor 201 as a circle center and the first current sensing distance D1 as a radius) includes the privacy concern object, i.e. the first content does not meet the privacy protection rule; in a case where the product of the object distance and the preset parameter is greater than the first current sensing distance D1, that is, when the privacy concern object P is located in position A0, it is determined that the image shooting range corresponding to the first device does not include the privacy concern object, that is, the first content meets the privacy protection rule.

For example, in some embodiments, the object distance between the first device and the privacy concern object may be acquired in a mode of: acquiring image information acquired by the image acquiring module on the first device; and analyzing the image information, to determine the object distance between the first device and the privacy concern object. It should be noted that in the above description, the operation of "determining the object distance between the first device and the privacy concern object" may be executed by the first device, so that the first content may directly include the object distance. However, the embodiments of the present disclosure are not limited thereto; and the operation of "determining the object distance between the first device and the privacy concern object" may also be executed by the server side, so that the first content may include the image information without including the object distance, and the server side processes the image information to determine the object distance.

For example, in some embodiments, the object distance between the first device and the privacy concern object may be acquired in a mode of: controlling activating the audio acquiring module on the first device; analyzing the audio information, in response to the audio information generated by the privacy concern object that is acquired by the audio acquiring module and the acquisition perspective of the image acquiring module on the first device being unchanged, to determine the object distance between the first device and privacy concern object. It should be noted that in the above description, the operation of "determining the object distance between the first device and the privacy concern object" may be executed by the first device, so that the first content may directly include the object distance. However, the embodiments of the present disclosure are not limited thereto; and the operation of "determining the object distance between the first device and the privacy concern object" may also be executed by the server side, so that the first content may include the audio information and the acquisition perspective information without including the object distance, and the server side processes the audio information and the acquisition perspective information to determine the object distance.

For example, in some embodiments, the object distance between the first device and the privacy concern object may be acquired in a mode of: receiving device location information input by a user; acquiring a scene structure of a location of the first device based on the device location information; and analyzing the scene structure to determine the object distance between the first device and privacy concern object. It should be noted that in the above description, the operation of "determining the object distance between the first device and the privacy concern object" may be executed by the first device, so that the first content may directly include the object distance. However, the embodiments of the present disclosure are not limited thereto, and the operation of "determining the object distance between the first device and the privacy concern object" may also be executed by the server side, so that the first content may include the device location information without including the object distance, and the server side processes the device location information to determine the object distance.

For example, in some embodiments, before executing the step of acquiring the identification information of the first device, and sending a content acquisition request to the first device, the device configuration information further includes: receiving trigger information sent from the second terminal. At this time, the trigger information is sent by the second terminal to the server side. The trigger information includes the identification information of the first device, so as to indicate need for device configuration on the first device. For example, the identification information is acquired by the second terminal, for example, the second terminal may acquire the identification information of the first device by means of scanning a QR code on the first device, Bluetooth pairing, Near Field Communication (NFC), etc.

For example, before the receiving trigger information sent from the second terminal, the device configuration method further includes: receiving a query request sent from the second terminal; and querying based on the query request and feeding back a query response to the second terminal.

For example, the query request may include the identification information of the first device; based on the query request, the server side may query all currently activated functions of the first device to form a function list, and then, the server side may feed back the query response including the function list to the second terminal. For example, in some embodiments, the query response includes the function list; all functions in the function list are activated functions; and the trigger information further includes a function identification code of at least one function in the function list. For example, in other embodiments, the query response includes the first content meeting the privacy protection rule or the first content not meeting the privacy protection rule. In such case, based on the query request, the server side may execute the operation of acquiring the first content, and judging whether the first content meets the privacy protection rule, and feeding back a judgment result to the second terminal in a form of query response.

For example, the function list includes at least one of functions below: a video call function, an image snapping function, a first pedestrian pass-by snapping function, and a first hover snapping function.

For example, in some embodiments, step S11 includes: controlling the first device to perform the video call function and/or the image snapping function, in a case where the function indicated by the function identification code included in the trigger information is a video call function and/or an image snapping function, to acquire a test video and/or a test picture, and determining a content acquisition response based on the test video and/or the test picture, and the first content in the content acquisition response includes the test video and/or the test picture; sending indication information to the second terminal to indicate a target user to pass through the first device following a preset path and controlling the first device executing the first pedestrian pass-by snapping function and/or the first hover snapping function to acquire a test snap content, in a case where the function indicated by the function identification code included in the trigger information is the first pedestrian pass-by snapping function and/or the first hover snapping function; and determining a content acquisition response, based on the test snap content, and the first content in the content acquisition response includes the test snap content.

For example, the test video and/or the test picture is a video and/or a picture acquired by the first device when executing the video call function and/or the image snapping function. The test snap content is a content acquired by the first device when executing the first pedestrian pass-by snapping function and/or the first hover snapping function.

For example, in some embodiments, in a case where the first content includes the test video and/or the test picture, step S12 includes: determining that the first content does not meet the privacy protection rule, in response to determining that the test video and/or the test picture includes the privacy concern object. For example, when the test video and/or the test picture does not include the privacy concern object, it is determined that the first content meets the privacy protection rule.

For example, in some embodiments, in a case where the first content includes the test snap content, step S12 includes: determining that the first content does not meet the privacy protection rule, in response to determining that the test snap content includes the target user; or, determining that the first content does not meet the privacy protection rule, in response to determining that the test snap content includes the target user and clarity of a region including the target user in the test snap content is greater than or equal to the clarity threshold. For example, when the test snap content does not include the target user, it is determined that the first content meets the privacy protection rule; when the test snap content includes the target user but the clarity of the region including the target user in the test snap content is less than the clarity threshold, it is determined that the first content meets the privacy protection rule.

For example, in some embodiments, the privacy concern object includes the target user.

For example, test snap content, the test video and/or the test picture maybe analyzed and recognized by using an object recognition technology based on neural networks.

For example, the preset path may be a path that the target user needs to pass through on a daily basis. The preset path may be set according to actual situations, which will not be limited in the embodiments of the present disclosure.

It should be noted that in the embodiments of the present disclosure, in a case where it is determined that the first content meets the privacy protection rule, device configuration may not be performed on the first device and/or second device, that is, at this time, the first device and/or second device may not infringe on privacy.

Figure 6:
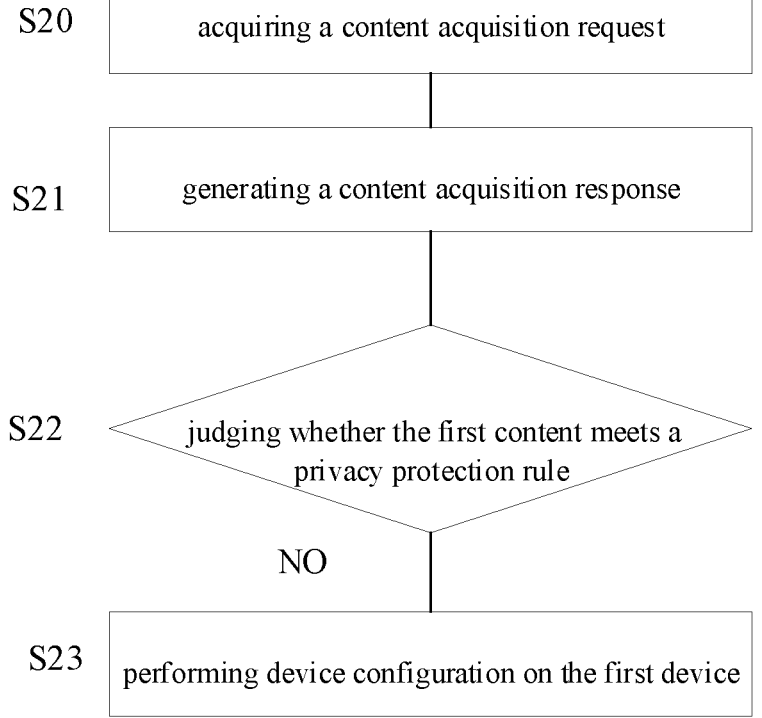
FIG. 6 is a schematic flow chart of another device configuration method provided by at least one embodiment of the present disclosure.

FIG. 6 is a schematic flow chart of another device configuration method provided by at least one embodiment of the present disclosure.

At least one embodiment of the present disclosure provides another device configuration method; the device configuration method is applied to a first device and may be executed by a processor or a computer. For example, the first device may be a smart home device such as a smart door lock, a smart visual doorbell, and a smart cat eye. The device configuration method may be applied to a field of the Internet of Things.

For example, as shown in FIG. 6, the device configuration method includes steps S20 to S23 below.

As shown in FIG. 6, step S20 includes: acquiring a content acquisition request.

As shown in FIG. 6, step S21 includes: generating a content acquisition response. For example, the content acquisition response includes a first content acquired by the first device.

As shown in FIG. 6, step S22 includes: judging whether the first content meets a privacy protection rule. If the first content does not meet the privacy protection rule, executing step S23: performing device configuration on the first device.

For example, in step S20, the content acquisition request is generated by the first device, that is, automatically triggered by the first device, to execute the operations in steps S21 to S23; or, the content acquisition request is sent by a server side to the first device, that is, triggered by the first device based on an instruction (i.e., the content acquisition request) sent by the server side, to execute steps S21 to S23.

For example, the first device is registered to the server side.

For example, in some embodiments, before executing the step of performing device configuration on the first device, the device configuration method further includes: sending a configuration adjustment confirmation request to a first terminal associated with the first device; and executing the step of performing device configuration on the first device, in response to receiving the configuration adjustment confirmation response sent from the first terminal.

For example, in some embodiments, step S23 includes: configuring at least one first function of the first device, so that the first content acquired by the configured first device meets the privacy protection rule. For example, the configuring at least one first function of the first device includes: configuring a function parameter of the at least one first function.

For example, in some embodiments, the at least one first function includes a first image shoot function, and the configuring at least one first function of the first device, includes: configuring the first image shoot function.

For example, in some embodiments, the at least one first function includes a first image shoot function and a first object sensing function; and the first image shoot function is activated or deactivated according to the first object sensing function. The configuring at least one first function of the first device, includes: configuring the first image shoot function and/or the first object sensing function.

For example, in some embodiments, the first device includes an image acquiring module; the image acquiring module is configured to implement the first image shoot function; the first content includes static image information and/or dynamic image information acquired by the image acquiring module; and the privacy protection rule includes that: the static image information and/or the dynamic image information does not include a privacy concern object, and/or clarity of a portion of the static image information and/or the dynamic image information that includes the privacy concern object is less than a clarity threshold. The function parameter of the first image shoot function includes a shooting distance corresponding to the image acquiring module.

For example, in some embodiments, in step S23, the configuring the first image shoot function includes: adjusting the time when the image acquisition module of the first device shoots the object, so as to limit the first image shoot function from the use time; and/or adjusting the shooting distance corresponding to the image acquiring module, to make clarity of an image within a predetermined range including the privacy concern object less than the clarity threshold or make a content captured by the image acquiring module exclude the privacy concern object.

For example, in some embodiments, the first device includes a first inductive sensor for implementing the first object sensing function, and the function parameter of the first object sensing function includes a sensing distance corresponding to the first inductive sensor. In step S23, the configuring the first object sensing function includes: adjusting the sensing distance corresponding to the first inductive sensor.

For example, in other embodiments, the first device includes a first inductive sensor and a second inductive sensor for implementing the first object sensing function; the function parameters of the first object sensing function include a sensing distance corresponding to the first inductive sensor and a sensing distance corresponding to the second inductive sensor; and the configuring the first object sensing function includes: configuring the sensing distance corresponding to the first inductive sensor and/or the sensing distance corresponding to the second inductive sensor.

For example, in other embodiments, at least one first function includes a first image shoot function, a first object sensing function, and a first snapping function; and the first snapping function is implemented based on the first object sensing function triggering the first image shoot function. In step S23, the configuring at least one first function of the first device, includes: configuring the first snapping function and/or the first object sensing function.

For example, in some embodiments, the first device includes a first inductive sensor for implementing the first object sensing function; the first snapping function includes a first pedestrian pass-by snapping function; the first pedestrian pass-by snapping function is implemented based on sensing data of the first inductive sensor triggering the first image shoot function; the first content includes static image information and/or dynamic image information acquired by the image acquiring module; and the privacy protection rule includes that: the static image information and/or the dynamic image information does not include a privacy concern object, and/or clarity of a portion of the static image information and/or the dynamic image information that includes the privacy concern object is less than a clarity threshold. In step S23, the configuring the first snapping function and/or the first object sensing function, includes: determining a first current sensing distance and a first sensing distance threshold corresponding to the first inductive sensor, and the first sensing distance threshold is a distance corresponding to a minimum sensing range of the first inductive sensor when sensing an object; determining an object distance between the first device and the privacy concern object; deactivating the first pedestrian pass-by snapping function, in response to a product of the object distance and a preset parameter being less than or equal to the first sensing distance threshold; adjusting the first current sensing distance, in response to the product of the object distance and the preset parameter being greater than the first sensing distance threshold and less than or equal to the first current sensing distance, so that the adjusted first current sensing distance is less than the object distance.

For example, in some embodiments, the first device includes a first inductive sensor and a second inductive sensor for implementing the first object sensing function; the first snapping function includes a first pedestrian pass-by snapping function and a first hover snapping function; the first pedestrian pass-by snapping function is implemented based on sensing data of the first inductive sensor triggering a first image shoot function; the first hover snapping function is implemented based on sensing data of the second inductive sensor triggering the first image shoot function; the first content includes static image information and/or dynamic image information acquired by the image acquiring module; and the privacy protection rule includes that: the static image information and/or the dynamic image information does not include a privacy concern object, and/or the clarity of a portion of the static image information and/or the dynamic image information that includes the privacy concern object is less than a clarity threshold. For example, in step S23, the configuring the first snapping function and/or the first object sensing function, includes: determining a first current sensing distance and a first sensing distance threshold corresponding to the first inductive sensor, and a second current sensing distance corresponding to the second inductive sensor, and the first sensing distance threshold is a distance corresponding to a minimum sensing range of the first inductive sensor when sensing an object, the second current sensing distance is less than the first current sensing distance; determining an object distance between the first device and the privacy concern object; adjusting the first current sensing distance in response to a product of the object distance and a preset parameter being greater than the first sensing distance threshold, so that the adjusted first current sensing distance is less than the product of the object distance and the preset parameter; deactivating the first pedestrian pass-by snapping function, in response to the product of the object distance and the preset parameter being less than or equal to the first sensing distance threshold and greater than the second current sensing distance; in response to the product of the object distance and the preset parameter being less than or equal to the first sensing distance threshold and less than or equal to the second current sensing distance: determining a second sensing distance threshold corresponding to the second inductive sensor, and the second sensing distance threshold is a distance corresponding to a minimum sensing range of the second inductive sensor when sensing an object; in response to the product of the object distance and the preset parameter being greater than the second sensing distance threshold, adjusting the second current sensing distance so that the adjusted second current sensing distance is less than the product of the object distance and the preset parameter, and deactivating the first pedestrian pass-by snapping function; and in response to the product of the object distance and the preset parameter being less than or equal to the second sensing distance threshold, deactivating the first pedestrian pass-by snapping function and the first hover snapping function.

For example, the preset parameter is a constant within a range of ⅓ to 1.

For example, in some embodiments, the server side has a second device corresponding thereto; and the device configuration method further includes: performing device configuration on the second device, in response to the first content not meeting the privacy protection rule.

For example, the first device includes a first inductive sensor for implementing the first object sensing function; the first snapping function includes a first pedestrian pass-by snapping function; the first pedestrian pass-by snapping function is implemented based on sensing data of the first inductive sensor triggering the first image shoot function; the second device has at least one second function; the at least one second function includes a second image shoot function and a second object sensing function; the second image shoot function is activated or deactivated according to the second object sensing function; the second device includes a third inductive sensor for implementing the second object sensing function; the first content includes static image information and/or dynamic image information acquired by the image acquiring module; and the privacy protection rule includes that: the static image information and/or the dynamic image information does not include a privacy concern object, and/or the clarity of a portion of the static image information and/or the dynamic image information that includes the privacy concern object is less than a clarity threshold. For example, in step S23, the configuring the first snapping function and/or the first object sensing function, includes: determining a first current sensing distance and a first sensing distance threshold corresponding to the first inductive sensor, and the first sensing distance threshold is a distance corresponding to a minimum sensing range of the first inductive sensor when sensing an object; receiving a third current sensing distance and a third sensing distance threshold corresponding to the third inductive sensor sent by the second device, and the third sensing distance threshold is a distance corresponding to a minimum sensing range of the third inductive sensor when sensing an object; determining a device distance between the first device and the second device; in response to a sum of the first sensing distance threshold and the third sensing distance threshold being less than or equal to the device distance, adjusting the first current sensing distance so that there is no overlapping sensing region between the first inductive sensor and the third inductive sensor; and deactivating the first pedestrian pass-by snapping function, in response to the sum of the first sensing distance threshold and the third sensing distance threshold being greater than the device distance.

For example, in some embodiments, the at least one second function further includes a second pedestrian pass-by snapping function; and the performing device configuration on the second device, includes: adjusting the third current sensing distance, in response to the sum of the first sensing distance threshold and the third sensing distance threshold being less than or equal to the device distance, so that there is no overlapping sensing region between the first inductive sensor and the third inductive sensor; and deactivating the second pedestrian pass-by snapping function, in response to the sum of the first sensing distance threshold and the third sensing distance threshold being greater than the device distance.

For example, in step S23, the configuring at least one first function of the first device, includes: in response to receiving a function configuration request sent from a second terminal; configuring at least one first function of the first device, based on the function configuration request; and sending a function configuration response to the second terminal, after configuring the at least one first function of the first device. For example, the function configuration request indicates configuring at least one first function in a function list.

For example, in some embodiments, a second device that is different from the first device is also registered to the server side; and before executing the step of acquiring the content acquisition request, the device configuration method further includes: acquiring trigger information. For example, in some examples, the trigger information is generated by the first device; and for another example, in other examples, the trigger information is generated by the server side and sent to the first device. For example, in some examples, the generating trigger information includes: acquiring first address information corresponding to the first device and second address information corresponding to the second device; and generating the trigger information, in response to the first address information and the second address information being identical. It should be noted that in some embodiments, the second device may be controlled by the server side; and the server side may acquire the second address information corresponding to the second device, and send the second address information to the first device.

For example, in some embodiments, before executing the step of acquiring the content acquisition request, the device configuration method further includes: controlling the first device sending a test request, and the test request includes a test signal and signal sending time; controlling the second device receiving the test request sent from the first device; and controlling the first device receiving a test response sent by the second device, and the test response includes signal receiving time. For example, step S21 may include: acquiring the test request sent by the first device and the test response sent by the second device; and generating the first content in the content acquisition response, based on the test request and the test response.

For example, the first device has a first object sensing function; the second device has a second object sensing function; the first device includes a first inductive sensor for implementing the first object sensing function; and the second device includes a third inductive sensor for implementing the second object sensing function. The privacy protection rule includes the first current sensing distance corresponding to the first inductive sensor and the third current sensing distance corresponding to the third inductive sensor, and indicate that there is no overlapping sensing region between the first inductive sensor and the third inductive sensor. For example, step S22 may include: determining the device distance between the first device and the second device, based on the test request and the test response in the first content; determining whether there is an overlapping sensing region between the first inductive sensor and the third inductive sensor, based on the first current sensing distance, the third current sensing distance, and the device distance; and determining that the first content does not meet the privacy protection rule, in response to there being an overlapping sensing region between the first inductive sensor and the third inductive sensor.

For example, before executing the step of acquiring the content acquisition request, the device configuration method further includes: generating trigger information.

For example, in some examples, the generating trigger information includes: acquiring image information, and the image information includes a video and/or a picture; analyzing the image information, to determine whether the image information includes a privacy concern object; and generating the trigger information, in response to the image information including the privacy concern object.

For example, in other examples, the generating trigger information includes: receiving audio information and acquisition perspective information; and generating the trigger information, in response to the audio information including sound emitted by the privacy concern object, and the acquisition perspective information indicating that an acquisition perspective of the image acquiring module on the first device has not changed.

For example, in other examples, the generating trigger information includes: receiving device location information; acquiring a scene structure of a location of the first device based on the device location information; and generating the trigger information, in response to the scene structure indicating that space corresponding to the first device includes the privacy concern object.

For example, in other examples, the generating trigger information includes: receiving input information; and generating the trigger information, in response to the input information indicating that the space corresponding to the first device includes the privacy concern object.

For example, in some embodiments, before executing the step of acquiring the content acquisition request, the device configuration method further includes: receiving trigger information sent from the second terminal. The trigger information includes the identification information of the first device; and the identification information is acquired by the second terminal.

For example, in some embodiments, the first device has a first object sensing function; the first device includes a first inductive sensor for implementing the first object sensing function; the privacy protection rule includes that the privacy concern object is located outside the sensing range of the first inductive sensor, and the first content includes the first current sensing distance corresponding to the first inductive sensor, and the object distance between the first device and the privacy concern object. For example, step S22 includes: determining the first current sensing distance corresponding to the first inductive sensor and the object distance between the first device and the privacy concern object, based on the first content; and determining that the first content does not meet the privacy protection rule, in response to the object distance being less than or equal to the first current sensing distance.

For example, in some embodiments, before the receiving trigger information sent from the second terminal, the device configuration method further includes: receiving a query request sent from the second terminal; and querying based on the query request and feeding back a query response to the second terminal. For example, the query response includes a function list; all functions in the function list are activated functions; and the trigger information further includes a function identification code of at least one function in the function list; or, the query response includes the first content meeting the privacy protection rule or the first content not meeting the privacy protection rule.

For example, the function list includes at least one of functions below: a video call function, an image snapping function, a first pedestrian pass-by snapping function, and a first hover snapping function.

For example, step S21 includes: controlling the first device executing the video call function and/or the image snapping function, in a case where the function indicated by the function identification code included in the trigger information is the video call function and/or the image snapping function, so as to acquire a test video and/or a test picture, and the test video and/or the test picture is a video and/or a picture acquired by the first device when executing the video call function and/or the image snapping function; generating a content acquisition response, based on the test video and/or the test picture, and the first content in the content acquisition response includes the test video and/or the test picture; sending indication information to the second terminal to indicate a target user to pass through the first device following a preset path and controlling the first device executing the first pedestrian pass-by snapping function and/or the first hover snapping function to acquire a test snap content, in a case where the function indicated by the function identification code included in the trigger information is the first pedestrian pass-by snapping function and/or the first hover snapping function; and generating the content acquisition response, based on the test snap content, and the first content in the content acquisition response includes the test snap content.

For example, the judging whether the first content meets the privacy protection rule, in a case where the first content includes the test video and/or the test picture, includes: determining that the first content does not meet the privacy protection rule, in response to determining that the test video and/or the test picture includes the privacy concern object;

the judging whether the first content meets the privacy protection rule in a case where the first content includes the test snap content, includes: determining that the first content does not meet the privacy protection rule, in response to determining that the test snap content includes the target user; or, determining that the first content does not meet the privacy protection rule, in response to determining that the test snap content includes the target user and clarity of a region including the target user in the test snap content is greater than or equal to the clarity threshold.

It should be noted that the device configuration method shown in FIG. 6 is similar to the device configuration method shown in FIG. 1, while differences rest in that: the device configuration method shown in FIG. 6 is applied to the first device and executed by the first device, while the device configuration method shown in FIG. 1 is applied to the server side and executed by the server side. The above description of the device configuration method shown in FIG. 1 is also applicable to the device configuration method shown in FIG. 6 without contradiction. It should be noted that some steps of the device configuration method shown in FIG. 1 may also be executed by the first device, and some steps of the device configuration method shown in FIG. 6 may also be executed by the server side, which may be set according to actual situations.

Hereinafter, the device configuration method provided by the embodiment of the present disclosure will be described through several specific embodiments.

Figure 7A:
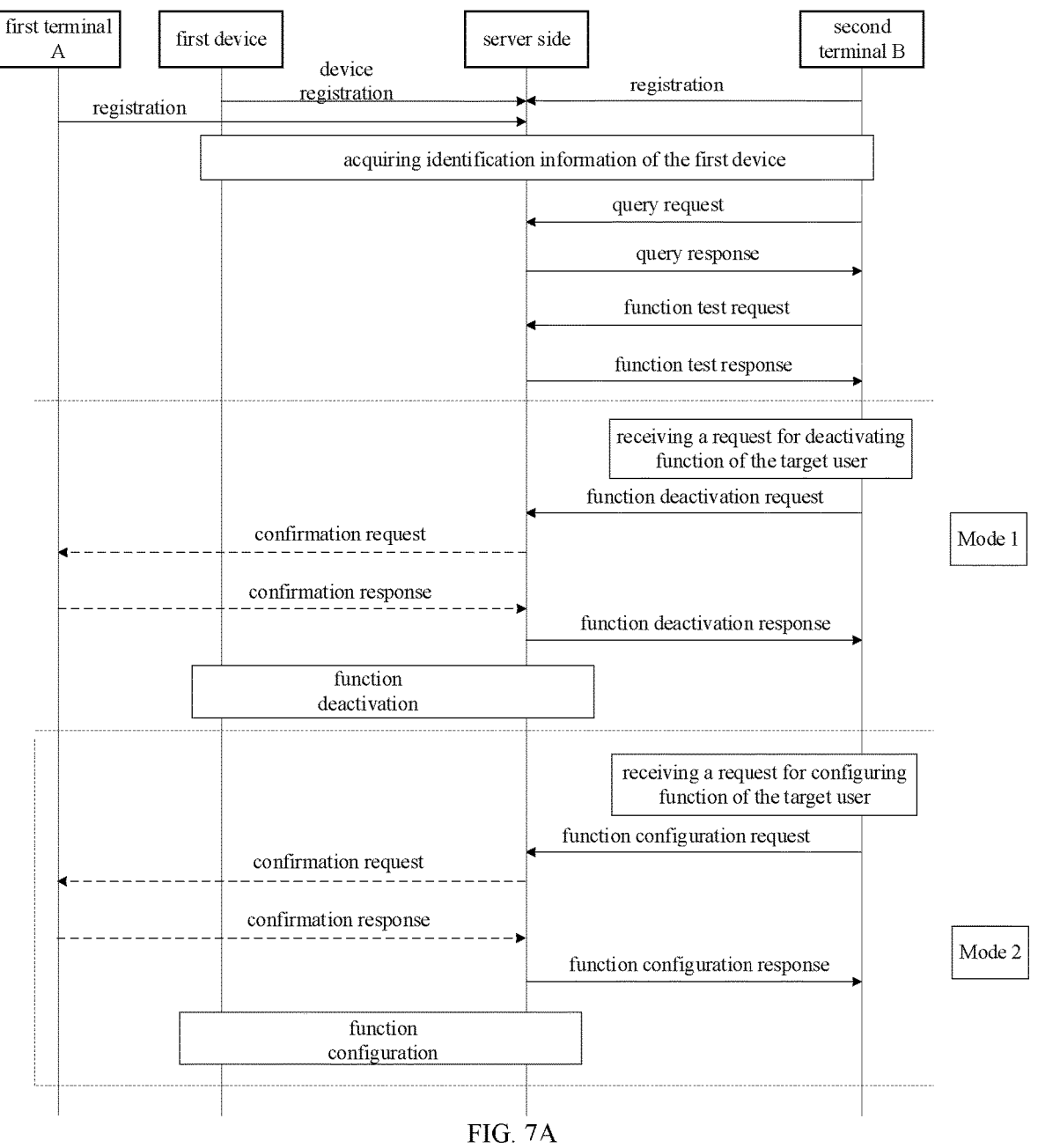
FIG. 7A is a schematic process diagram of a device configuration method provided by some embodiments of the present disclosure.

FIG. 7A is a schematic process diagram of a device configuration method provided by some embodiments of the present disclosure.

For example, in some embodiments, a privacy concern object includes a target user (e.g., a neighbor of a user associated with a first device), a door, an elevator, etc.; and the device configuration method may be triggered by the target user, and executed by a server side and/or the first device.

As shown in FIG. 7A, firstly, the first device, a first terminal A, and a second terminal B send a registration request to the server side, to implement registration on the server side. A user associated with the second terminal B may include the target user. Then, the second terminal B may acquire identification information of the first device, for example, a device identification code; for example, the second terminal B may acquire the identification information of the first device by means of scanning a QR code on the first device, Bluetooth pairing, NFC, etc. Then, the second terminal B sends a query request to the server side, the query request includes the identification information of the first device; the server side queries based on the query request, and sends a query response to the second terminal B; for example, the query response includes a function list; and all functions in the function list are activated functions.

The second terminal B receives the query response sent by the server side; and based on the query response, the user associated with the second terminal B may determine whether the privacy protection rule is met. When it is necessary to determine that the privacy protection rule is not met, the second terminal B may send trigger information to the server side; the trigger information may include a function test request; the function test request includes the identification information of the first device, a function identification code of a function to be tested, and so on. Based on the function test request, the server side or the first device may execute a function test, and judge whether the first device meets the privacy protection rule based on a result of the function test; then, a function test response including the judgment result may be sent to the second terminal B.

Table 1 shows an example of a function list, test contents, and test conclusions.

receiving a confirmation response sent by the first terminal A, the server side executes the step of configuring the first device. For another example, after receiving the function deactivation request, the server side may directly execute the step of configuring the first device without confirmation

TABLE 1

| Function list | Test contents | Test conclusions |
| --- | --- | --- |
| Video call function | Whether a privacy concern object is included? Testing method: sending, by the second terminal, a function test request to the server side, to instruct the server side to control the first device shooting a video; feeding back, by the server side, a test result to the second terminal, the test result including: the video and whether the video includes the privacy concern object. | If the video includes the privacy concern object, it is determined that the privacy protection rule is met. |
| Image snapping function | Whether a privacy concern object is included? Testing method: sending, by the second terminal, a function test request to the server side, to instruct the server side to control the first device shooting a picture; feeding back, by the server side, a test result to the second terminal, the test result including: the picture and whether the picture includes the privacy concern object. | If the image includes the privacy concern object, it is determined that the privacy protection rule is not met. |
| Pedestrian pass-by snapping function | Whether to snap daily travel of the target user? Testing method: sending, by the second terminal, a function test request to the server side; receiving an instruction from the server side so that the target user passes through the first device according to a preset path; feeding back, by the server side, a test result to the second terminal, the test result including: whether the target user has been snapped and the snap content. | If the target user has been snapped, it is determined that the privacy protection rule is not met; or, in a case where the target user has been snapped, the snap content may be judged: if a clear image of the target user is included, it is determined that the privacy protection rule is not met. |
| Hover snapping function | Whether to snap daily travel of the target user? Testing method: sending, by the second terminal, a function test request to the server side; receiving an instruction from the server side, so that the target user passes through the first device according to a preset path; feeding back, by the server side, a test result to the second terminal, the test result including: whether the target user has been snapped and the snap content. | If the target user has been snapped, it is determined that the privacy protection rule is not met; or, in a case where the target user has been snapped, the snap content may be judged: if a clear image of the target user is included, it is determined that the privacy protection rule is not met. |

When the test result indicate that the privacy protection rule is not met, the second terminal B may send a function request (a function deactivation request or a function configuration request in FIG. 7A) to the server side, to instruct the server side and/or the first device to perform device configuration on the first device, so as to make the first device meet the privacy protection rule and prevent the first device from infringing on privacy. After the server side and/or the first device completes the operation of device configuration on the first device, a function response (a function deactivation response or a function configuration response in FIG. 7A) may be sent to the second terminal B.

As shown in FIG. 7A, two modes (mode 1 and mode 2) may be adopted to perform device configuration on the first device.

In mode 1, the second terminal B receives a request for deactivating function sent by the target user, and sends the function deactivation request to the server side. For example, after receiving the function deactivation request, the server side may send a confirmation request to the first terminal A associated with an owner of the first device; after from the first terminal A. For example, after the server side has already executed the operation of configuring the first device (e.g., deactivating some functions), the server side may send a function deactivation response to the second terminal B. For example, the server side interacts with the first device to complete the process of deactivating some functions in the first device.

In mode 2, the second terminal B receives a function configuration request from the target user, and sends the function configuration request to the server side; the function configuration request may include the identification information of the first device and the function identification code of the function; the configuration contents may include at least one of contents below: adjusting the focal length of the camera on the first device, the sensing range of the inductive sensor on the first device, and snap time, etc. Similarly, after receiving the function configuration request, the server side may send a confirmation request to the first terminal A associated with the owner of the first device; after receiving a confirmation response sent by the first terminal A, the server side executes the step of configuring the first device. For another example, after receiving the function configuration request, the server side may directly execute the step of configuring the first device without confirmation from the first terminal A. For example, after the server side has already executed the operation of configuring the first device (e.g., configuring some functions), the server side may send a function configuration response to the second terminal B. For example, the server side interacts with the first device to complete the process of configuring the functions in the first device (e.g., adjusting parameters, etc.).

Table 2 shows an example of a function list, test contents, test conclusions, and configuration contents.

TABLE 2

| Function list | Test contents | Test conclusions |
|---|---|---|
| Video call function | Whether the video includes a privacy concern object? | If the video includes the privacy concern object, it is determined that it does not meet the privacy protection rule. Configuration content: adjusting the focal length of the camera, etc. |
| Image snapping function | Whether the picture includes a privacy concern object? | If the picture includes the privacy concern object, it is determined that the privacy protection rule is not met. Configuration content: adjusting the focal length of the camera, etc. |
| Pedestrian pass-by snapping function | Whether to snap daily travel of the target user? | If the daily travel of the target user has been snapped, it is determined that the privacy protection rule is not met; Configuration content: adjusting the sensing range of the inductive sensor and/or snap time, etc. |
| Hover snapping function | Whether to snap daily travel of the target user? | If the daily travel of the target user has been snapped, it is determined that the privacy protection rule is not met; Configuration content: adjusting the sensing range of the inductive sensor and/or snap time, etc. |

For example, in some embodiments, when the functions and/or the parameters of the first device change again, information may be sent to the second terminal B to notify the second terminal B.

Figure 7B:
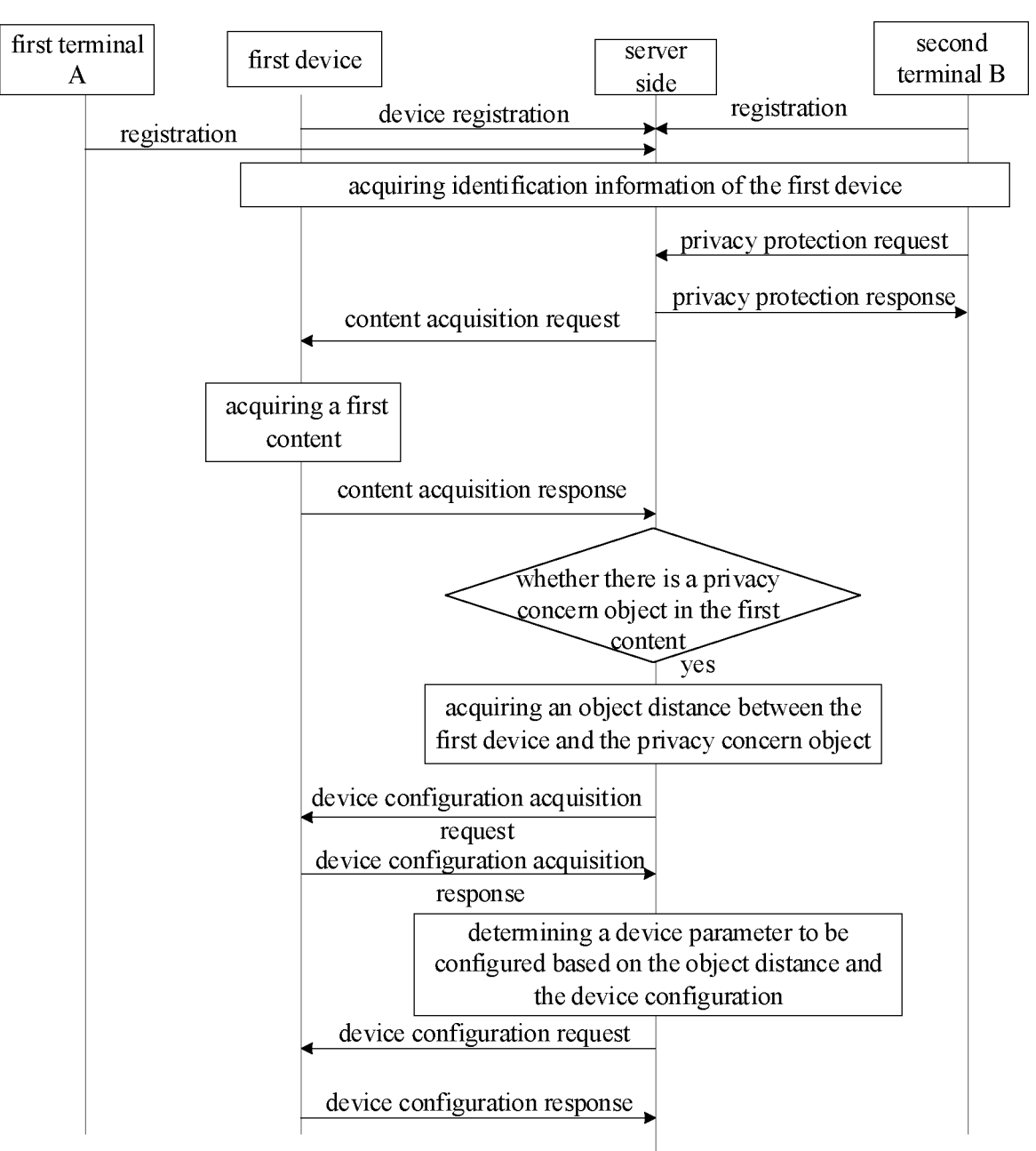
FIG. 7B is a schematic process diagram of another device configuration method provided by some embodiments of the present disclosure.

FIG. 7B is a schematic process diagram of another device configuration method provided by some embodiments of the present disclosure.

For example, in some embodiments, a privacy concern object includes a target user (e.g., a neighbor of a user associated with a first device), a door, an elevator, etc.; and the device configuration method may be triggered by the target user, and executed by a server end and/or the first device.

As shown in FIG. 7B, firstly, the first device, a first terminal A, and a second terminal B send a registration request to the server side, to implement registration on the server side. A user associated with the second terminal B may include the target user. Then, the second terminal B may acquire identification information of the first device, for example, a device identification code; for example, the second terminal B may acquire the identification information of the first device by means of scanning a QR code on the first device, Bluetooth pairing, NFC, etc. Then, the second terminal B sends trigger information to the server side; the trigger information includes a privacy protection request; and the privacy protection request includes information such as the identification information of the first device.

For example, in some embodiments, the server side executes the device configuration method provided by the embodiments of the present disclosure based on the privacy protection request; and after executing the device configuration method, sends a privacy protection response to the second terminal B. For another example, in some embodiments, after receiving the privacy protection request, the server side may send the privacy protection response to the second terminal B. The privacy protection response may indicate that the server side has successfully received the privacy protection request sent by the second terminal B.

During the process of executing the device configuration method, the server side sends a content acquisition request to the first device; after receiving the content acquisition request, the first device acquires a first content, and returns a content acquisition response including the first content to the server side. For example, the first content may include one or more items of information that may be acquired by the first device, such as a picture, a video, a dot map (acquired by a laser radar sensor), an audio (acquired by a sound sensor), and may include information processed by the first device, such as a sensing distance corresponding to the inductive sensor, an object distance between the first device and the privacy concern object, and a device distance between the first device and the second device; based on the content acquisition response, the server side judges whether the first content meets the privacy protection rule, that is, judges whether there is a privacy concern object (a person, a door, an elevator, etc.) in the first content; when there is a privacy concern object, the server side further acquires an object distance between the first device and the privacy concern object; the server side sends a device configuration acquisition request to the first device; the first device returns a device configuration acquisition response to the server side; the server side determines a device parameter to be configured based on the object distance and the device configuration; the server side sends a device configuration request to the first device, to control the first device performing device configuration; for example, the device configuration request may include the device parameter to be configured; and the server side receives a device configuration response returned by the first device. The device configuration response may be sent by the first device after the first device completes device configuration. It should be noted that the detailed description in the above-described embodiments may be referred to for a specific process of "performing device configuration on the first device", and no details will be repeated here.

Figure 7C:
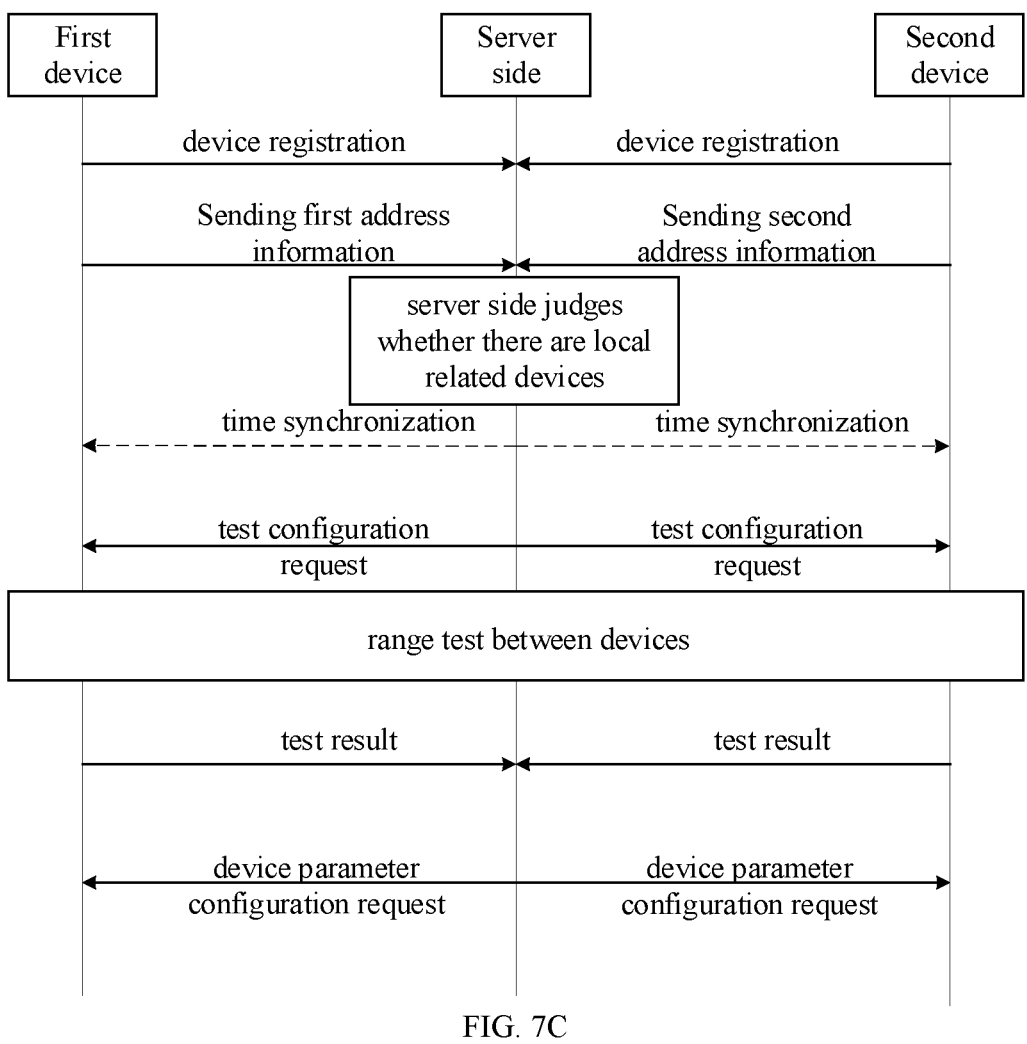
FIG. 7C is a schematic process diagram of another device configuration method provided by some embodiments of the present disclosure.

FIG. 7C is a schematic process diagram of another device configuration method provided by some embodiments of the present disclosure.

For example, in some embodiments, the device configuration method may be triggered by a server side, and executed by the server side and/or a first device. A privacy concern object includes a target user (e.g., a neighbor of a user associated with the first device), a door, an elevator, etc.

Each of the first device and the second device integrates an inductive sensor (e.g., PIR), a video surveillance sensor, etc.; for example, as shown in FIG. 2B, the first device includes a first inductive sensor 201; and as shown in FIG. 2C, the second device includes a third inductive sensor 301.

As shown in FIG. 7C, the first device and the second device send registration requests to the server side, to implement registration on the server side. In some examples, the first device may acquire first address information input by a user and send the first address information to the server side, while the second device may acquire second address information input by a user and send the second address information to the server side. The first address information/second address information needs to be specific to floor, for example, floor XX, unit XX, building XX, community XX, etc. the first address information/the second address information should be in standard format to avoid failure to compare address information input by different users.

It should be noted that in other examples, the first address information may be sent to the server side by a terminal corresponding to the first device; and the second address information may be sent to the server side by a terminal corresponding to the second device.

For example, original address information corresponding to the first device and/or original address information corresponding to the second device may be processed by using hash operations to acquire the first address information and/or the second address information; and then the first address information and the second address information are sent to the server side, to ensure that the original address information is not sent to the server side, and avoid information leakage.

For example, the server side may judge whether there are local related devices; for example, the server side may judge whether the first device and the second device are local related devices based on the first address information and the second address information; when the first address information and the second address information are identical, the server side determines that the first device and the second device are local related devices; and when the first address information and the second address information are different, the server side determines that the first device and the second device are not local related devices. The description in the above-described embodiments may be referred to for a mode of comparison between the first address information and the second address information.

For example, if the first address information and the second address information are identical, the server side determines that there are a plurality of devices, namely, the first device and the second device, in a same location; the server side may send a test configuration request to the first device and the second device, to implement a range test between the first device and the second device. For example, the first device is set as a sending end, the second device is set as a receiving end; the sending end sends a test request, the test request includes a signal such as sound and light, as well as signal sending time; the receiving end captures the sent test request to determine a test response; the test response may include signal receiving time; the first device sends a test result (including the test request) to the server side; and the second device also sends a test result (including the test response) to the server side. The server side may determine whether the first device and the second device are located in a same location and determine information such as a distance between the first device and second device, through the test request and the test response.

It should be noted that, as shown in FIG. 7C, before sending the test configuration request to the first device and the second device, the server side may send a time synchronization instruction to the first device and the second device, to synchronize the first device and the second device, so as to facilitate subsequent calculation of information such as the distance between the first device and the second device.

The server side sends a device parameter configuration request to the first inductive sensor of the first device and the third inductive sensor of the second device, and analyzes a device parameter configuration response returned from the first device and the second device, so as to ensure that there is no overlapping sensing region between the first device and the second device through configuration.

When there are a plurality of devices in adjacent locations, and each device is integrated with a inductive sensor, there may be overlapping sensing regions between the inductive sensors of the plurality of devices. For example, as shown in FIG. 5, with respect to the first device and the second device, a current sensing distance of a first inductive sensor 201 of the first device is D1, and a current sensing distance of a third inductive sensor 301 of the second device is D3, so there is an overlapping sensing region OP between the first inductive sensor 201 and the third inductive sensor 301. When a person appears in the overlapping sensing region OP, both the first device and the second device may trigger the image snapping function. Because the person appearing in the overlapping sensing region OP is only associated with one device, in order to avoid the above-described situation, parameters (sensing distances, etc.) of the first inductive sensor 201 and the third inductive sensor 301 may be adjusted to avoid an overlapping sensing region between the first inductive sensor 201 and the third inductive sensor 301. For example, the current sensing distance of the first inductive sensor 201 of the first device may be adjusted to Dth1, and the current sensing distance of the third inductive sensor 301 of the second device may be adjusted to Dth3, so there is no overlapping sensing region between the first inductive sensor 201 and the third inductive sensor 301.

It should be noted that if overlapping sensing regions cannot be avoided, certain functions of the first device and/or the second device (e.g., the pedestrian pass-by snapping function, etc.) may be deactivated to avoid the situation that the first device and second device snap pictures simultaneously.

For example, in some embodiments, the device configuration method may be triggered by the first device, and executed by the server side and/or the first device. A privacy concern object includes a target user (e.g., a neighbor of a user associated with the first device), a door, an elevator, etc.

For example, the first device may include a plurality of inductive sensors, for example, as shown in FIG. 2A, the first device 200 may include a first inductive sensor 201 and a second inductive sensor 202. As shown in FIG. 4A, a current sensing distance of the first inductive sensor 201 is D1; and a current sensing distance of the second inductive sensor 202 is D2.

For example, in some embodiments, when the first device is started, an image acquiring module on the first device may capture an image (a picture and/or a video). In some examples, the first device recognizes a content of the image, while in other examples, the first device may send the above-described image to the server side, and the server side recognizes the content of the image. For example, the recognized object includes a privacy concern object, for example, a door of other user, a public facility (including a corridor, an elevator, a stair, etc.), a person, etc. When it is recognized that the content of the image includes the privacy concern object, trigger information may be generated to trigger execution of the device configuration method.

For example, in other embodiments, input information input by a user associated with the first device may be received; when the input information indicates that space corresponding to the first device includes the privacy concern object, trigger information is generated, to trigger execution of the device configuration method.

For example, after generating the trigger information, an object distance between the first device and the privacy concern object may be further judged, and a product of the object distance and a preset parameter, and a relationship between the current sensing distance of the first inductive sensor 201 and the current sensing distance of the second inductive sensor 202 may be judged; based on the above-described relationship, the current sensing distance of the first inductive sensor 201 and/or the current sensing distance of the second inductive sensor 202 may be adjusted, or certain functions of the first device and/or the second device may be deactivated. For example, in some examples, the sensing distance of the first inductive sensor 201 and the sensing distance of the second inductive sensor 202 may be adjusted, so that the current sensing distance of the second inductive sensor 202 is less than the object distance (or ½ of the object distance, ⅓ of the object distance, etc.), and the current sensing distance of the first inductive sensor 201 is greater than the current sensing distance of the second inductive sensor 202. At this time, when the first inductive sensor 201 detects an object (e.g., a privacy concern object), the camera is not triggered to execute a snapping operation; when the second inductive sensor 202 detects an object (e.g., a privacy concern object), the camera is triggered to execute a snapping operation; when the object is located in a sensing region corresponding to the first inductive sensor 201, the camera is not triggered; when the object is located in the sensing region corresponding to the second inductive sensor 202, the camera is turned on; and the function may be referred to as a "friend pass-by" snapping function. For example, when the first inductive sensor 201 and the second inductive sensor 202 simultaneously detect an object, the camera is triggered to execute a snapping operation.

Figure 8:
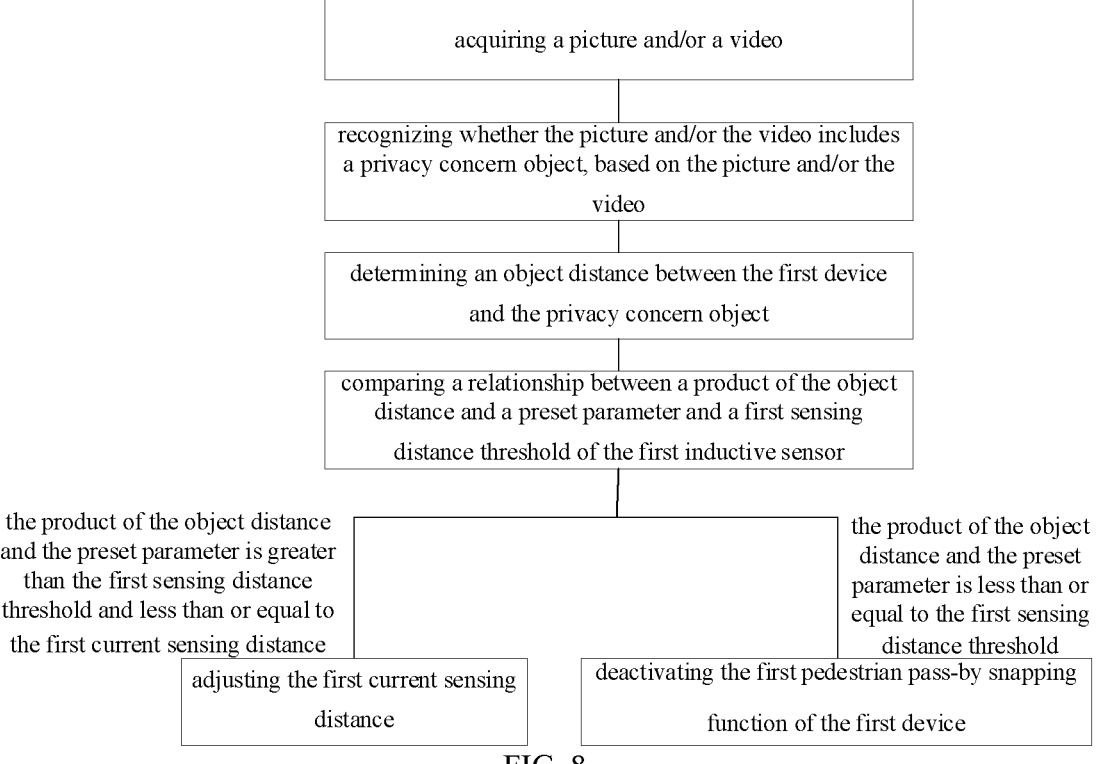
FIG. 8 is a schematic flow chart of a device configuration method provided by some embodiments of the present disclosure.

FIG. 8 is a schematic flow chart of a device configuration method provided by some embodiments of the present disclosure.

For example, in some embodiments, the device configuration method may be triggered by a first device, and executed by a server side and/or the first device. A privacy concern objects include a target user (e.g., a neighbor of a user associated with the first device), a door, an elevator, etc.

For example, as shown in FIG. 8, the device configuration method may include: acquiring a picture and/or a video; recognizing whether the picture and/or the video includes a privacy concern object, based on the picture and/or the video; determining an object distance between the first device and the privacy concern object, in a case where it is determined that the picture and/or the video includes the privacy concern object; comparing a relationship between a product of the object distance and a preset parameter and a first sensing distance threshold of the first inductive sensor; deactivating the first pedestrian pass-by snapping function of the first device, when the product of the object distance and the preset parameter is less than or equal to the first sensing distance threshold; adjusting the first current sensing distance, when the product of the object distance and the preset parameter is greater than the first sensing distance threshold and less than or equal to the first current sensing distance, so that the adjusted first current sensing distance is less than the product of the object distance and the preset parameter.

For example, the first device may include an inductive sensor; for example, as shown in FIG. 2A, the first device 200 may include a first inductive sensor 201.

For example, in some embodiments, when the first device is started, an image acquiring module on the first device may capture an image (a picture and/or a video). In some examples, the first device recognizes a content of the image, while in other examples, the first device may send the above-described image to the server side, and the server side recognizes the content of the image. For example, the recognized object includes a privacy concern object, for example, a door of other user, a public facility (including a corridor, an elevator, a stair, etc.), a person, etc. When it is recognized that the content of the image includes the privacy concern object, trigger information may be generated to trigger execution of the device configuration method.

For example, in other embodiments, after the first device is started for a period of time, an audio acquiring module on the first device may be turned on to acquire an audio; for example, if the audio acquiring module on the first device acquire a sound of opening and closing a door, an elevator switch, etc., it is further determined whether an acquisition perspective of the image acquiring module on the first device has changed; if the acquisition perspective of the image acquiring module on the first device has not changed, it indicates that the first device perceives presence of a privacy concern object such as a door and an elevator around, so that the trigger information may be generated, to trigger execution of the device configuration method.

For example, in other embodiments, the first device is started and is registered to the server side; the first device receives input information input by the user associated with the first device; the input information may include information such as address and building number of the user; in some examples, the first device sends the input information to the server side, and the server side acquires a scene structure of a scene (e.g., a house) where the first device is located, based on the input information sent by the first device; the server side determines whether there is a privacy concern object (e.g., a door, a wall, a stair, etc.) in a space corresponding to the first device based on the structure of the scene; in other examples, the first device may directly acquire the scene structure of the scene (e.g., the house) where the first device is located based on the input information; and the first device determines whether there is a privacy concern object (e.g., a door, a wall, a stair, etc.) in the space corresponding to the first device based on the structure of the scene.

For example, in other embodiments, the input information input by the user associated with the first device may be received; and when the input information indicates that the space corresponding to the first device includes the privacy concern object, the trigger information is generated, to trigger execution of the device configuration method.

Figure 9A:
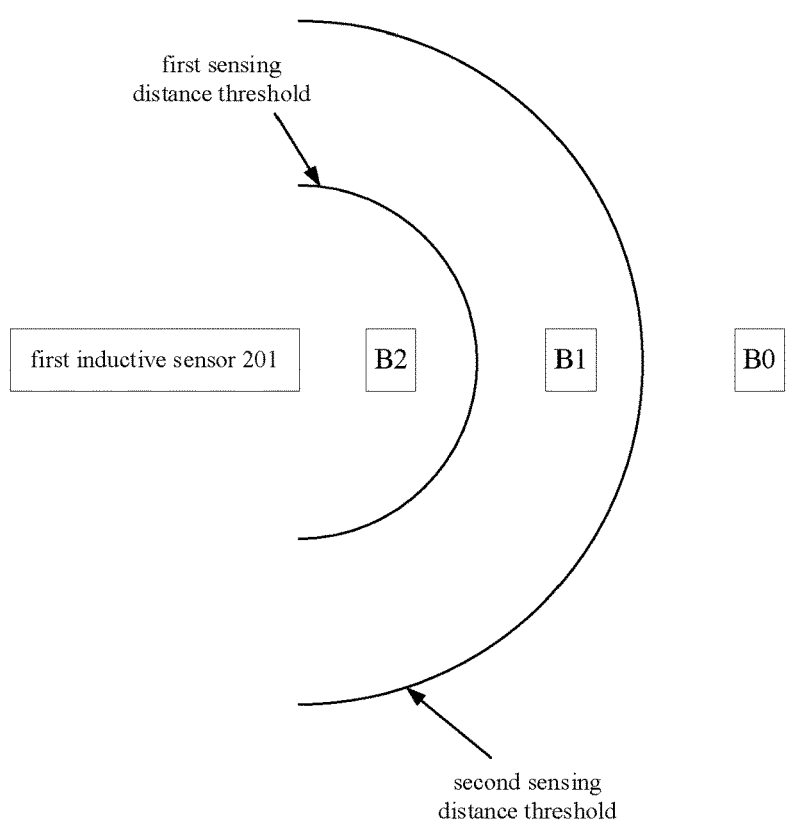
FIG. 9A is a schematic diagram of a sensing distance threshold corresponding to the first inductive sensor provided by some embodiments of the present disclosure.
Figure 9B:
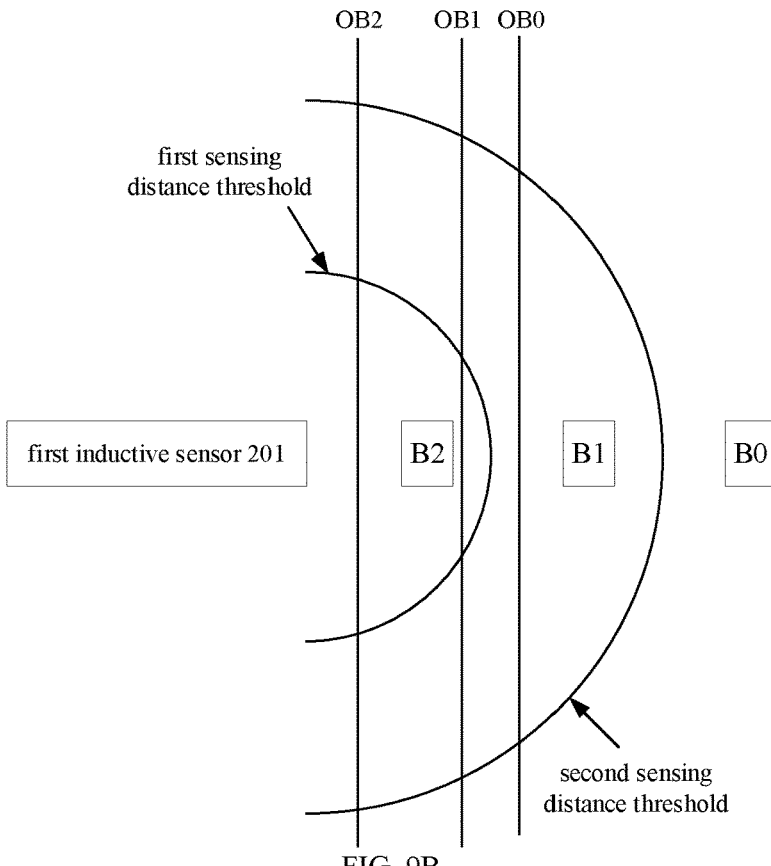
FIG. 9B is another schematic diagram of the sensing distance threshold corresponding to the first inductive sensor provided by some embodiments of the present disclosure.

For example, as shown in FIG. 9A and FIG. 9B, the first inductive sensor 201 corresponds to a first sensing distance threshold and a second sensing distance threshold; the second sensing distance threshold is greater than the first sensing distance threshold; the first sensing distance threshold is a distance corresponding to a minimum sensing range of the first inductive sensor when sensing an object, that is, the first sensing distance threshold is a minimum sensing distance threshold corresponding to the first inductive sensor; the second sensing distance threshold is a distance corresponding to a maximum sensing range of the first inductive sensor when sensing an object, that is, the second sensing distance threshold is a maximum sensing distance threshold corresponding to the first inductive sensor; and the current sensing distance of the first inductive sensor 201 is greater than or equal to the first sensing distance threshold and less than or equal to the second sensing distance threshold.

For example, in some embodiments, the preset parameter is 1; after generating the trigger information, the object distance between the first device and the privacy concern object may be further judged, and a relationship between a product of the object distance and a preset parameter (i.e. 1) (i.e. the object distance) and the current sensing distance of the first inductive sensor 201 may be compared; as shown in FIG. 9A, if the privacy concern object is located in B0, i.e., the object distance is greater than the second sensing distance threshold, the current sensing distance of the first inductive sensor 201 may not be adjusted; if the privacy concern object is located in B1, i.e., the object distance is less than the second sensing distance threshold, the current sensing distance of the first inductive sensor 201 is set to be less than the object distance, for example, the current sensing distance of the first inductive sensor 201 is set to be the first sensing distance threshold; and if the privacy concern object is located in B2, the first pedestrian pass-by snapping function is deactivated.

For example, in other embodiments, the preset parameter is ½, as shown in FIG. 9B, after generating the trigger information, the object distance between the first device and the privacy concern object may be further judged, and a relationship between a product of the object distance and a preset parameter (i.e. ½) (i.e. ½ of the object distance) and the first current sensing distance of the first inductive sensor 201 may be compared; as shown in FIG. 9B, if the privacy concern object is located in B0, the product of the object distance and the preset parameter is a distance between a median line OB0 and the first inductive sensor 201; if the distance between the median line OB0 and the first inductive sensor 201 is greater than the first sensing distance threshold, the current sensing distance of the first inductive sensor 201 is set to be less than the product of the object distance and the preset parameter, that is, less than the distance between the median line OB0 and the first inductive sensor 201; for example, the current sensing distance of the first inductive sensor 201 is set as the first sensing distance threshold; if the privacy concern object is located in B1 or B2, the product of the object distance and the preset parameter is a distance between the median line OB1 or OB2 and the first inductive sensor 201, and the distance between the median line OB1 or OB2 and the first inductive sensor 201 is less than the first sensing distance threshold, so the first pedestrian pass-by snapping function may be deactivated.

For example, the object distance between the first device and the privacy concern object may be a distance between the camera on the first device and the privacy concern object, which may be calculated by means of laser/infrared ranging, depth camera ranging, etc.

For example, in the example shown in FIG. 9A, when the privacy concern object is located in B1 or B2, a focal length of the camera of the first device may also be adjusted, so that the focal length of the camera is less than the object distance between the first device and the privacy concern object, so as to avoid the camera from acquiring an image including the privacy concern object; in the example shown in FIG. 9B, when the privacy concern object is located in B0, B1 or B2, the focal length of the camera of the first device may also be adjusted, so that the focal length of the camera is less than ½ of the object distance between the first device and the privacy concern object, so as to avoid the camera from capturing an image including the privacy concern object.

Figure 10:
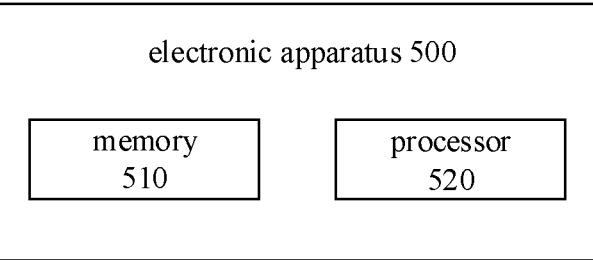
FIG. 10 is a schematic diagram of an electronic apparatus provided by some embodiments of the present disclosure.

Some embodiments of the present disclosure further provide an electronic apparatus. FIG. 10 is a schematic diagram of an electronic apparatus provided by some embodiments of the present disclosure.

For example, as shown in FIG. 10, the electronic apparatus 500 may include: a memory 510 and a processor 520. It should be noted that the components of the electronic apparatus 500 shown in FIG. 10 are only exemplary rather than restrictive, and the electronic apparatus 500 may further have other components, according to actual application needs.

For example, the memory 510 is configured to non-temporarily store computer-readable instructions; the processor 520 is configured to run the computer-readable instructions; and when run by the processor 520, the computer-readable instructions execute one or more steps of the device configuration method according to any one of the above-described embodiments.

For example, components such as the memory 510 and the processor 520 may communicate with each other through network connections. The network may include a wireless network, a wired network, and/or any combination of the wireless network and the wired network. The network may include a local area network, the Internet, a telecommunication network, the Internet of Things based on the Internet and/or the telecommunication network, and/or any combination of the above networks. The wired network, for example, may adopt twisted pair, coaxial cable, or fiber optic transmission for communication, while the wireless network may adopt communication modes such as a 3G/4G/5G mobile communication network, Bluetooth, Zigbee, or WiFi. Types and functions of networks will not be limited in the present disclosure.

For example, the processor 520 may control other components in the electronic apparatus 500 to execute desired functions. The processor 520 may be a Central Processing Unit (CPU), a Tensor Processing Unit (TPU), a Graphics Processing Unit (GPU), a microprocessor, or other devices having data processing capabilities and/or program execution capabilities. The Central Processing Unit (CPU) may be X86 or ARM architecture, etc.

For example, the memory 510 may include any combination of one or more computer program products; and the computer program products may include various forms of computer-readable storage media, for example, a volatile memory and/or a non-volatile memory. The volatile memory may include, for example, a Random Access Memory (RAM) and/or a cache, or the like. The non-volatile memory may include, for example, a Read Only Memory (ROM), a hard disk, an Erasable Programmable Read Only Memory (EPROM), a portable Compact Disk Read Only Memory (CD-ROM), a USB memory, a flash memory, or the like. One or more computer-readable instructions may be stored on the computer-readable storage medium, and the processor 510 may run the computer-readable instructions, to implement various functions of the electronic apparatus 500. Various applications and various data may also be stored on the computer-readable storage medium.

It should be noted that the electronic apparatus 500 provided by the embodiment of the present disclosure may adopt Android system, IOS system, Harmony system, Windows system, etc.

For example, the relevant description in the embodiments of the above-described device configuration method maybe referred for detailed illustration about the process of the electronic apparatus 500 executing the device configuration method, and no details will be repeated here.

Figure 11:
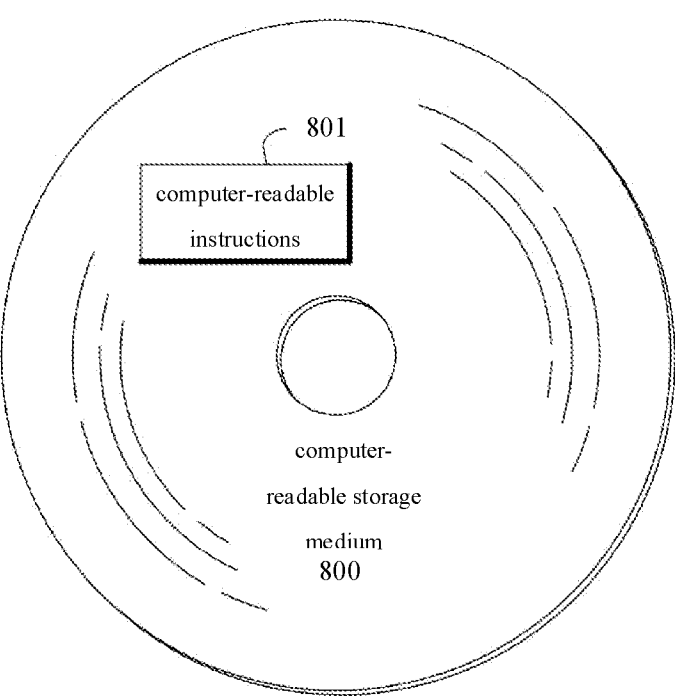
FIG. 11 is a schematic diagram of a computer-readable storage medium provided by some embodiments of the present disclosure.

Some embodiments of the present disclosure further provide a computer-readable storage medium. FIG. 11 is a schematic diagram of a computer-readable storage medium provided by some embodiments of the present disclosure. For example, as shown in FIG. 11, one or more computer-readable instructions 801 may be non-temporarily stored on the computer-readable storage medium 800. For example, when executed by a computer, the computer-readable instruction 801 may cause the computer to execute one or more steps in the device configuration method according to any one of the above-described embodiments.

For example, the computer-readable storage medium 800 may be applied to the electronic apparatus according to any one of the above-described embodiments, for example, the computer-readable storage medium 800 may be a memory 510 in the electronic apparatus 500.

For example, the description of the memory 510 in the embodiment of electronic apparatus 500 according to any one of the above-described embodiments may be referred to for illustration of the computer-readable storage medium 800, and no details will be repeated here.

For this disclosure, the following points need to be explained:

(1) The drawings of the embodiment of the present disclosure only relate to the structure related to the embodiment of the present disclosure, and other structures can refer to the general design.

(2) For the sake of clarity, the thickness and size of layers or structures are exaggerated in the drawings used to describe embodiments of the present invention. It should be understood that when an element such as a layer, film, region or substrate is referred to as being "on" or "under" another element, the element may be "directly" on or "under" another element, or intervening elements may be present.

(3) Without conflict, the embodiments of the present disclosure and the features in the embodiments can be combined with each other to obtain a new embodiment.

The above is only the specific embodiment of this disclosure, but the protection scope of this disclosure is not limited to this, and the protection scope of this disclosure shall be subject to the protection scope of the claims.

The invention claimed is:

1. A device configuration method, applied to a server side, and comprising:

acquiring identification information of a first device, and sending a content acquisition request to the first device;

acquiring a content acquisition response sent by the first device, wherein the content acquisition response comprises a first content acquired by the first device; and judging whether the first content meets a privacy protection rule, and performing device configuration on the first device in response to the first content not meeting the privacy protection rule;

the performing device configuration on the first device comprises:

configuring at least one first function of the first device to make the first content acquired by the first device configured meet the privacy protection rule;

wherein the configuring at least one first function of the first device comprises: configuring a function parameter of the at least one first function;

the at least one first function comprises a first image shoot function; and the configuring at least one first function of the first device comprises: configuring the first image shoot function;

the first device comprises an image acquiring module, the image acquiring module is configured to implement the first image shoot function; and the first content comprises static image information and/or dynamic image information acquired by the image acquiring module;

the privacy protection rule comprises that: the static image information and/or the dynamic image information does not comprise a privacy concern object, and/or clarity of a portion of the static image information and/or the dynamic image information that comprises the privacy concern object is less than a clarity threshold;

the function parameter of the first image shoot function comprises a shooting distance corresponding to the image acquiring module, the configuring the first image shoot function, comprises:

adjusting the shooting distance corresponding to the image acquiring module, the shooting distance represents a distance range from an object that can be clearly photographed by the image acquisition module to the image acquisition module, to make a clarity of an image within a predetermined range comprising the privacy concern object less than the clarity threshold or make a content shot by the image acquiring module exclude the privacy concern object.

2. The device configuration method according to claim 1, wherein before performing device configuration on the first device, the device configuration method further comprises:

sending a configuration adjustment confirmation request to a first terminal associated with the first device; and performing device configuration on the first device in response to receiving the configuration adjustment confirmation response sent from the first terminal.

3. The device configuration method according to claim 1, wherein the configuring the first image shoot function, further comprises:

adjusting time for the image acquiring module of the first device to capture the object, so as to limit the first image shoot function in terms of usage time.

4. The device configuration method according to claim 1, wherein the at least one first function comprises a first image shoot function, a first object sensing function, and a first snapping function, and the first snapping function is implemented based on the first object sensing function triggering the first image shoot function, the configuring at least one first function of the first device, comprises: configuring the first snapping function and/or the first object sensing function.

5. The device configuration method according to claim 4, wherein the first device comprises a first inductive sensor for implementing the first object sensing function, the first snapping function comprises a first pedestrian pass-by snapping function, and the first pedestrian pass-by snapping function is implemented based on sensing data of the first inductive sensor triggering the first image shoot function;

the first content comprises static image information and/or dynamic image information acquired by the image acquiring module;

the privacy protection rule comprises that: the static image information and/or the dynamic image information does not comprise a privacy concern object, and/or clarity of a portion of the static image information and/or the dynamic image information that comprises the privacy concern object is less than a clarity threshold;

the configuring the first snapping function and/or the first object sensing function, comprises:

determining a first current sensing distance and a first sensing distance threshold corresponding to the first inductive sensor, wherein the first sensing distance threshold is a distance corresponding to a minimum sensing range of the first inductive sensor when sensing an object;

determining an object distance between the first device and the privacy concern object;

deactivating the first pedestrian pass-by snapping function, in response to a product of the object distance and a preset parameter being less than or equal to the first sensing distance threshold;

in response to the product of the object distance and the preset parameter being greater than the first sensing distance threshold and less than or equal to the first current sensing distance, adjusting the first current sensing distance so that the first current sensing distance adjusted is less than the object distance.

6. The device configuration method according to claim 4, wherein the first device comprises a first inductive sensor and a second inductive sensor for implementing the first object sensing function, the first snapping function comprises a first pedestrian pass-by snapping function and a first hover snapping function, the first pedestrian pass-by snapping function is implemented based on sensing data of the first inductive sensor triggering the first image shoot function, the first hover snapping function is implemented based on sensing data of the second inductive sensor triggering the first image shoot function;

the first content comprises static image information and/or dynamic image information acquired by the image acquiring module;

the privacy protection rule comprises that: the static image information and/or the dynamic image information does not comprise a privacy concern object, and/or clarity of a portion of the static image information and/or the dynamic image information that comprises the privacy concern object is less than a clarity threshold;

the configuring the first snapping function and/or the first object sensing function, comprises:

determining a first current sensing distance and a first sensing distance threshold corresponding to the first inductive sensor, and determining a second current sensing distance corresponding to the second inductive sensor, wherein the first sensing distance threshold is a distance corresponding to a minimum sensing range of the first inductive sensor when sensing an object, the second current sensing distance is less than the first current sensing distance;

determining an object distance between the first device and the privacy concern object;

in response to a product of the object distance and a preset parameter being greater than the first sensing distance threshold, adjusting the first current sensing distance to make the first current sensing distance adjusted less than the product of the object distance and the preset parameter;

deactivating the first pedestrian pass-by snapping function in response to the product of the object distance and the preset parameter being less than or equal to the first sensing distance threshold and greater than the second current sensing distance;

in response to the product of the object distance and the preset parameter being less than or equal to the first sensing distance threshold and less than or equal to the second current sensing distance:

determining a second sensing distance threshold corresponding to the second inductive sensor, wherein the second sensing distance threshold is a distance corresponding to a minimum sensing range of the second inductive sensor when sensing an object;

in response to the product of the object distance and the preset parameter being greater than the second sensing distance threshold, and adjusting the second current sensing distance so that the second current sensing distance adjusted is less than the product of the object distance and the preset parameter, and deactivating the first pedestrian pass-by snapping function; and deactivating the first pedestrian pass-by snapping function and the first hover snapping function, in response to the product of the object distance and the preset parameter being less than or equal to the second sensing distance threshold.

7. The device configuration method according to claim 4, wherein the server side has a second device corresponding thereto;

the device configuration method further comprises:

performing device configuration on the second device, in response to the first content not meeting the privacy protection rule;

wherein the first device comprises a first inductive sensor for implementing the first object sensing function, the first snapping function comprises a first pedestrian pass-by snapping function, and the first pedestrian pass-by snapping function is implemented based on sensing data of the first inductive sensor triggering the first image shoot function;

the second device has at least one second function, the at least one second function comprises a second image shoot function and a second object sensing function, the second image shoot function is activated or deactivated according to the second object sensing function, and the second device comprises a third inductive sensor for implementing the second object sensing function;

the first content comprises static image information and/or dynamic image information acquired by the image acquiring module;

the privacy protection rule comprises that: the static image information and/or the dynamic image information does not comprise a privacy concern object, and/or clarity of a portion of the static image information and/or the dynamic image information that comprises the privacy concern object is less than a clarity threshold;

the configuring the first snapping function and/or the first object sensing function, comprises:

determining a first current sensing distance and a first sensing distance threshold corresponding to the first inductive sensor, and a third current sensing distance and a third sensing distance threshold corresponding to the third inductive sensor, wherein the first sensing distance threshold is a distance corresponding to a minimum sensing range of the first inductive sensor when sensing an object, and the third sensing distance threshold is a distance corresponding to a minimum sensing range of the third inductive sensor when sensing an object;

determining a device distance between the first device and the second device;

adjusting the first current sensing distance, in response to a sum of the first sensing distance threshold and the third sensing distance threshold being less than or equal to the device distance, so that no overlapping sensing region exists between the first inductive sensor and the third inductive sensor; and deactivating the first pedestrian pass-by snapping function, in response to the sum of the first sensing distance threshold and the third sensing distance threshold being greater than the device distance.

8. The device configuration method according to claim 7, wherein the at least one second function further comprises a second pedestrian pass-by snapping function, the performing device configuration on the second device, comprises:

adjusting the third current sensing distance, in response to the sum of the first sensing distance threshold and the third sensing distance threshold being less than or equal to the device distance, so that no overlapping sensing region exists between the first inductive sensor and the third inductive sensor;

deactivating the second pedestrian pass-by snapping function, in response to the sum of the first sensing distance threshold and the third sensing distance threshold being greater than the device distance.

9. The device configuration method according to claim 1, wherein a second device different from the first device is also registered to the server side, before acquiring the identification information of the first device, and sending the content acquisition request to the first device, the device configuration method further comprises: generating trigger information, wherein the generating trigger information, comprises:

receiving first address information corresponding to the first device and second address information corresponding to the second device; and generating the trigger information, in response to the first address information and second address information being identical.

10. The device configuration method according to claim 9, wherein before acquiring the identification information of the first device, and sending the content acquisition request to the first device, the device configuration method further comprises:

controlling the first device to send a test request, wherein the test request comprises a test signal and signal sending time;

controlling the second device to receive the test request sent by the first device; and controlling the first device to receive a test response sent by the second device, wherein the test response comprises signal receiving time;

wherein the acquiring a content acquisition response sent by the first device, comprises:

acquiring the test request sent by the first device and the test response sent by the second device; and determining the first content in the content acquisition response, based on the test request and the test response.

11. The device configuration method according to claim 1, wherein before acquiring the identification information of the first device, and sending the content acquisition request to the first device, the device configuration method further comprises: generating trigger information, wherein the generating trigger information, comprises:

acquiring image information, wherein the image information comprises a video and/or a picture;

analyzing the image information, to determine whether the image information comprises a privacy concern object; and generating the trigger information, in response to the image information comprising the privacy concern object; or the generating trigger information, comprises:

receiving audio information and acquisition perspective information; and generating the trigger information, in response to the audio information comprising sound emitted by the privacy concern object, and the acquisition perspective information indicating that an acquisition perspective of the image acquiring module on the first device has not changed; or the generating trigger information, comprises:

receiving device location information;

acquiring a scene structure of a location of the first device based on the device location information; and generating the trigger information, in response to the scene structure indicating that a space corresponding to the first device comprises the privacy concern object;

or the generating trigger information, comprises:

receiving input information; and generating the trigger information, in response to the input information indicating that the space corresponding to the first device comprises the privacy concern object.

12. The device configuration method according to claim 1, wherein before acquiring the identification information of the first device, and sending the content acquisition request to the first device, the device configuration method further comprises: receiving trigger information sent from the second terminal, wherein the trigger information comprises the identification information of the first device, and the identification information is acquired by the second terminal.

13. The device configuration method according to claim 12, wherein before receiving the trigger information sent from the second terminal, the device configuration method further comprises:

receiving a query request sent from the second terminal; and querying based on the query request and feeding back a query response to the second terminal, wherein the query response comprises a function list, all functions in the function list are activated functions, and the trigger information further comprises a function identification code of at least one function in the function list; or, the query response comprises the first content meeting the privacy protection rule or the first content not meeting the privacy protection rule.

14. The device configuration method according to claim 13, wherein the function list comprises at least one of functions below: a video call function, an image snapping function, a first pedestrian pass-by snapping function, and a first hover snapping function, the acquiring a content acquisition response sent by the first device, comprises:

in a case where a function indicated by the function identification code comprised in the trigger information is the video call function and/or the image snapping function, controlling the first device performing the video call function and/or the image snapping function, to acquire a test video and/or a test picture, wherein the test video and/or the test picture is a video and/or a picture acquired by the first device when performing the video call function and/or the image snapping function; determining the content acquisition response based on the test video and/or the test picture, wherein the first content in the content acquisition response comprises the test video and/or the test picture;

in a case where the function indicated by the function identification code comprised in the trigger information is the first pedestrian pass-by snapping function and/or the first hover snapping function, sending indication information to the second terminal to indicate a target user to pass through the first device following a preset path and controlling the first device perform the first pedestrian pass-by snapping function and/or the first hover snapping function to acquire a test snap content; and determining the content acquisition response, based on the test snap content, wherein the first content in the content acquisition response comprises the test snap content.

15. A device configuration method, applied to a first device, and comprising:

acquiring a content acquisition request;

generating a content acquisition response, wherein the content acquisition response comprises a first content acquired by the first device;

judging whether the first content meets a privacy protection rule, and performing device configuration on the first device in response to the first content not meeting the privacy protection rule;

the performing device configuration on the first device comprises:

configuring at least one first function of the first device to make the first content acquired by the first device configured meet the privacy protection rule;

wherein the configuring at least one first function of the first device comprises: configuring a function parameter of the at least one first function;

the at least one first function comprises a first image shoot function; and the configuring at least one first function of the first device comprises: configuring the first image shoot function;

the first device comprises an image acquiring module, the image acquiring module is configured to implement the first image shoot function; and the first content comprises static image information and/or dynamic image information acquired by the image acquiring module;

the privacy protection rule comprises that: the static image information and/or the dynamic image information does not comprise a privacy concern object, and/or clarity of a portion of the static image information and/or the dynamic image information that comprises the privacy concern object is less than a clarity threshold;

the function parameter of the first image shoot function comprises a shooting distance corresponding to the image acquiring module, the configuring the first image shoot function, comprises:

adjusting the shooting distance corresponding to the image acquiring module, the shooting distance represents a distance range from an object that can be clearly photographed by the image acquisition module to the image acquisition module, to make a clarity of an image within a predetermined range comprising the privacy concern object less than the clarity threshold or make a content shot by the image acquiring module exclude the privacy concern object.

16. The device configuration method according to claim 15, wherein the performing device configuration on the first device, comprises: configuring at least one first function of the first device, so that the first content acquired by the first device configured meets the privacy protection rule;

wherein the configuring at least one first function of the first device comprises: configuring a function parameter of the at least one first function.

17. An electronic apparatus, comprising:

a memory, configured to non-temporarily store computer-readable instructions; and a processor, configured to run the computer-readable instructions;

wherein when run by the processor, the computer-readable instructions execute a device configuration method, wherein the device configuration method is applied to a server side, and comprises:

acquiring identification information of a first device, and sending a content acquisition request to the first device;

acquiring a content acquisition response sent by the first device, wherein the content acquisition response comprises a first content acquired by the first device;

judging whether the first content meets a privacy protection rule, and performing device configuration on the first device in response to the first content not meeting the privacy protection rule;

the performing device configuration on the first device comprises:

configuring at least one first function of the first device to make the first content acquired by the first device configured meet the privacy protection rule;

wherein the configuring at least one first function of the first device comprises: configuring a function parameter of the at least one first function;

the at least one first function comprises a first image shoot function; and the configuring at least one first function of the first device comprises: configuring the first image shoot function;

the first device comprises an image acquiring module, the image acquiring module is configured to implement the first image shoot function; and the first content comprises static image information and/or dynamic image information acquired by the image acquiring module;

the privacy protection rule comprises that: the static image information and/or the dynamic image information does not comprise a privacy concern object, and/or clarity of a portion of the static image information and/or the dynamic image information that comprises the privacy concern object is less than a clarity threshold;

the function parameter of the first image shoot function comprises a shooting distance corresponding to the image acquiring module, the configuring the first image shoot function, comprises:

adjusting the shooting distance corresponding to the image acquiring module, the shooting distance represents a distance range from an object that can be clearly photographed by the image acquisition module to the image acquisition module, to make a clarity of an image within a predetermined range comprising the privacy concern object less than the clarity threshold or make a content shot by the image acquiring module exclude the privacy concern object.

18. A computer-readable storage medium, non-temporarily storing computer-readable instructions, wherein when run by a computer, the computer-readable instructions cause the computer to execute the device configuration method according to claim 1.

* * * * *